_United States Patent_ [19]

Moore et al.

[11] 3,729,253
[45] Apr. 24, 1973

[54] OPTICAL SYSTEM COMPRISING A SINGLE ELEMENT HAVING A CONTINUOUSLY VARYING INDEX OF REFRACTION

[75] Inventors: Duncan Thomas Moore, Yardley, Pa.; Peter John Sands, Garran, A.C.T., Australia

[73] Assignee: Western Electric Company, Incorporated, New York, N.Y.

[22] Filed: May 28, 1971

[21] Appl. No.: 148,070

[52] U.S. Cl. ............ 350/175 GN, 350/197, 350/206
[51] Int. Cl. .................... G02b 3/00, G02b 9/02
[58] Field of Search ................ 350/175 GN, 197, 350/96 WG

[56] References Cited

UNITED STATES PATENTS 3,486,808  12/1969  Hamblen .................. 350/175 GN
3,617,917  11/1971  Uchida .................. 350/175 GN X

FOREIGN PATENTS OR APPLICATIONS 609,615  10/1948  Great Britain .................. 350/197

OTHER PUBLICATIONS

Murty "Laminated Lens" Journal of the Optical Society of America Vol. 46, Nov. 1956, pp. 998, 999.
Wood Physical Optics, 2nd Edition, Published 1911, pp. 86–90. QC 355 W6.
Rawson et al. "Analysis of Refractive Index Distributions in Cylindrical, Graded–Index Rods (Grin Rods) Used as Image Relays" Applied Optics Vol. 9, No. 3, March 1970, pp. 753–759.
Sands "Third–Order Aberrations of Inhomogeneous Lenses" Journal of the Optical Society of America Vol. 60, No. 11, Nov. 1970, pp. 1436–1443.
Moore "Design of Singlets with Continuously Varying Indices of Refraction" Journal of the Optical Society of America Vol. 60, No. 11, Nov. 1970, p. 1557.

Primary Examiner—John K. Corbin
Attorney—W. M. Kain, J. B. Hoofnagle, Jr. and R. C. Winter

[57] ABSTRACT

Singlet lenses, and optical systems comprising a singlet lens and a stop, in which at least third-order distortions such as spherical aberration, coma, astigmatism and distortion are reduced by the use of glasses having radial, or axial, refractive index gradients.

28 Claims, 19 Drawing Figures

DOUBLE GRAPHING APLANATIC SINGLET AXIAL GRADIENT

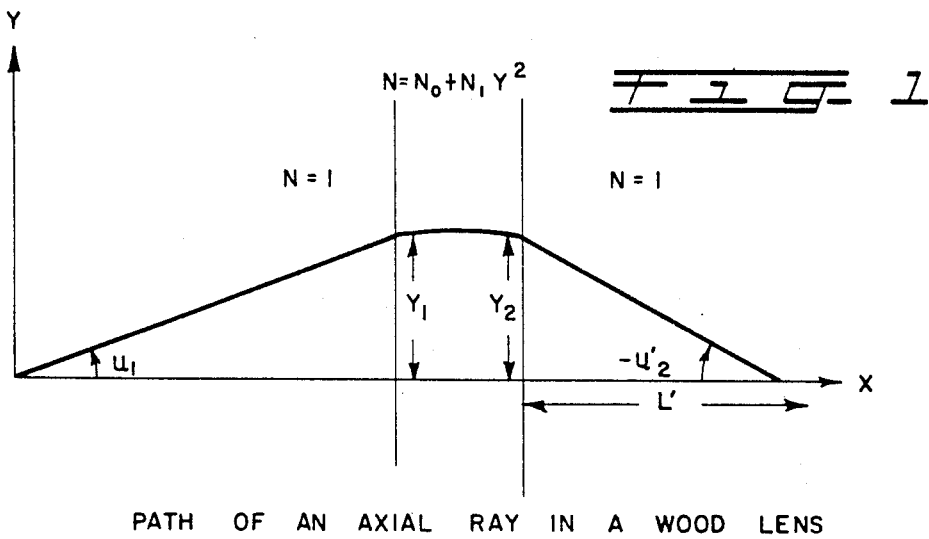
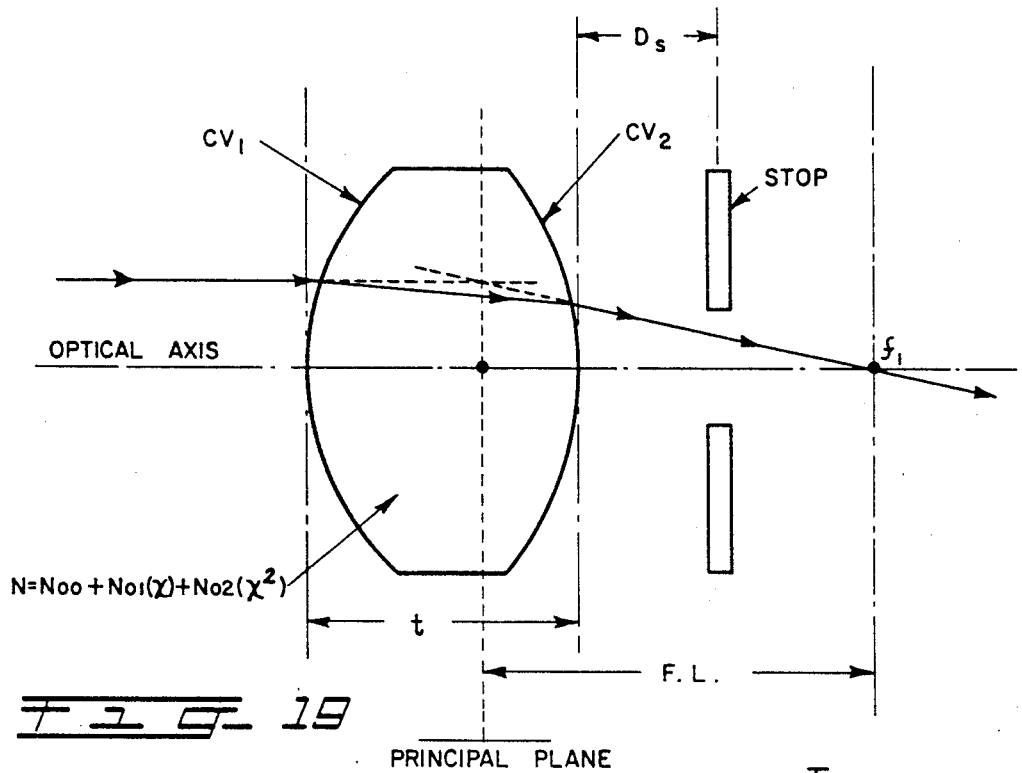

DOUBLE GRAPHING APLANATIC SINGLET AXIAL GRADIENT

STOP SHIFT TO ELIMINATE DISTORTION—APLANATIC SINGLET

SPHERICAL AND COMATIC ABERRATIONS FOR RAMP—AXIAL GRADIENT

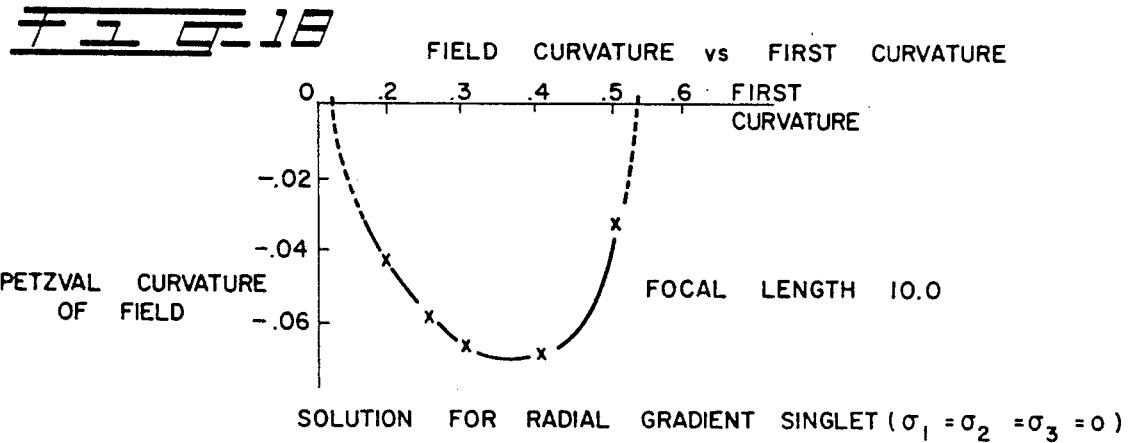
FIG. 1B — FIELD CURVATURE vs FIRST CURVATURE
SOLUTION FOR RADIAL GRADIENT SINGLET ($\sigma_1 = \sigma_2 = \sigma_3 = 0$)
FOCAL LENGTH 10.0
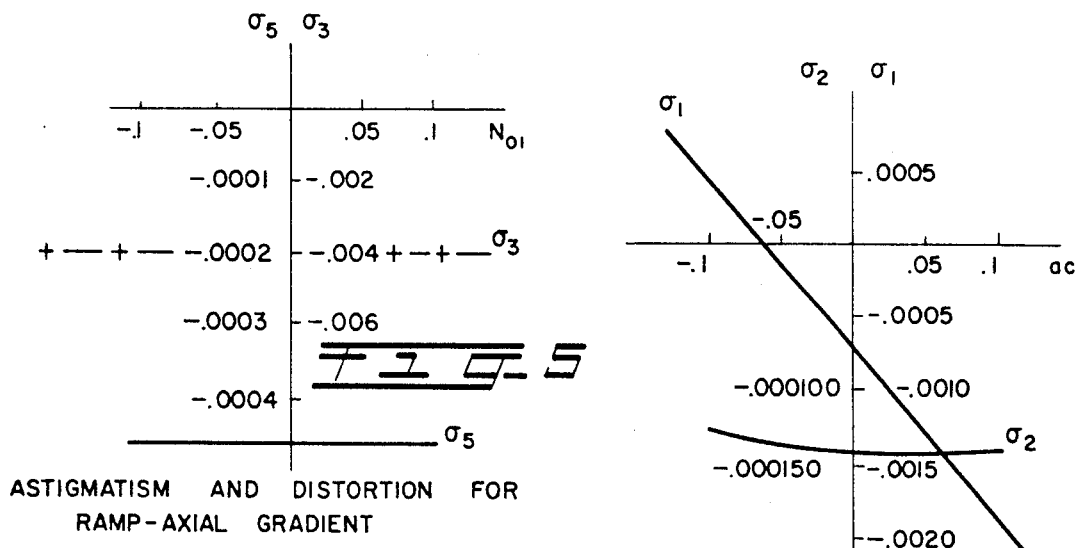
FIG. 5 — ASTIGMATISM AND DISTORTION FOR RAMP-AXIAL GRADIENT
FIG. 6 — SPHERICAL AND COMATIC ABERRATIONS FOR EXPONENTIAL-AXIAL GRADIENT
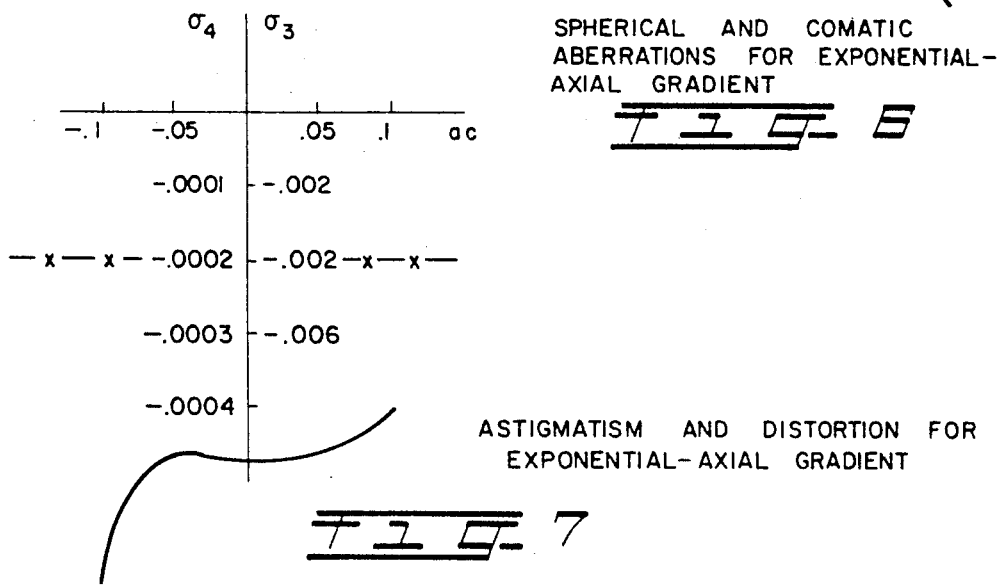
FIG. 7 — ASTIGMATISM AND DISTORTION FOR EXPONENTIAL-AXIAL GRADIENT

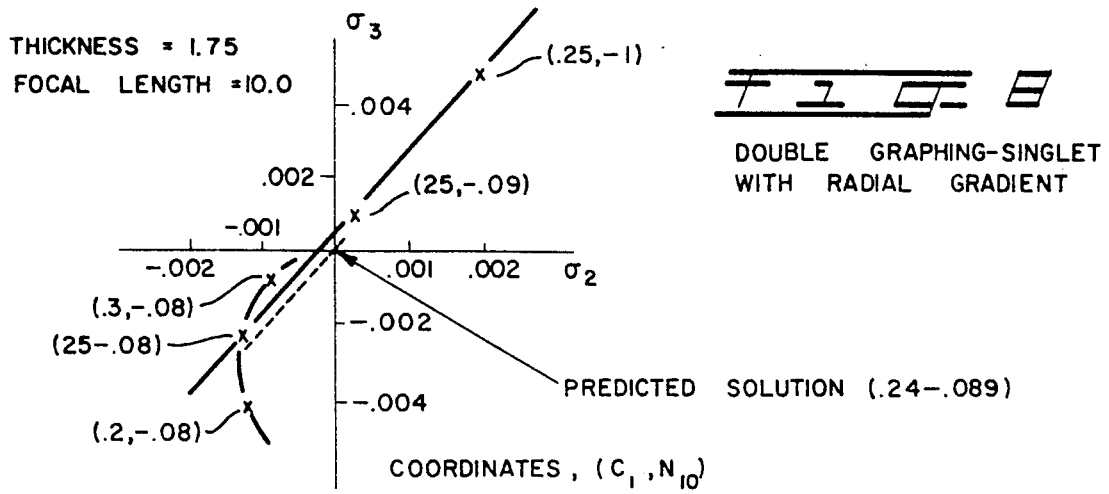
FIG. 8 DOUBLE GRAPHING-SINGLET WITH RADIAL GRADIENT
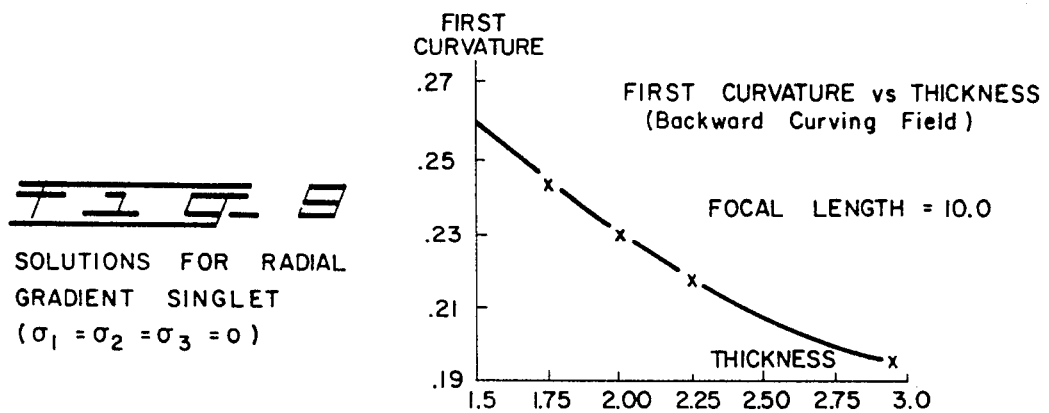
FIG. 9 SOLUTIONS FOR RADIAL GRADIENT SINGLET ($\sigma_1 = \sigma_2 = \sigma_3 = 0$)
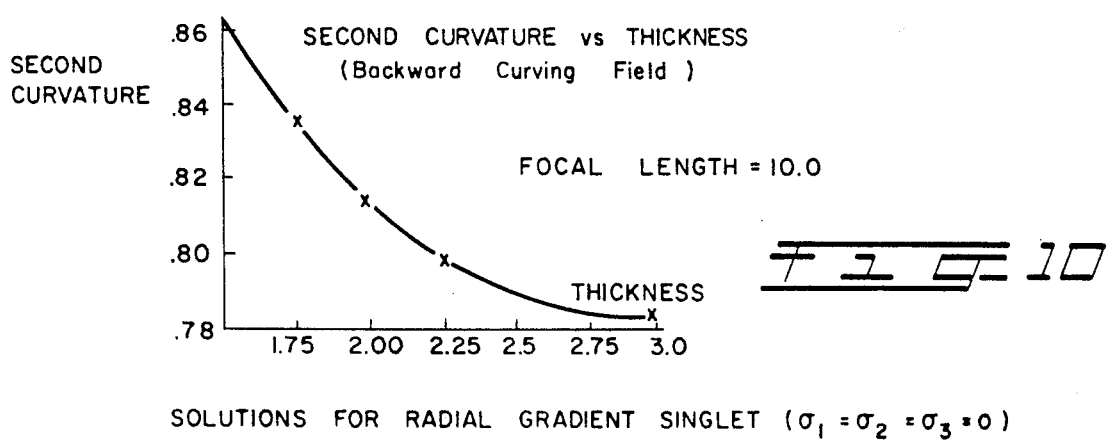
FIG. 10
SOLUTIONS FOR RADIAL GRADIENT SINGLET ($\sigma_1 = \sigma_2 = \sigma_3 = 0$)

OPTICAL SYSTEM COMPRISING A SINGLE ELEMENT HAVING A CONTINUOUSLY VARYING INDEX OF REFRACTION

BACKGROUND OF THE INVENTION

1. Field of the Invention

Broadly speaking, this invention relates to optical lenses. More particularly, in a preferred embodiment, this invention relates to a singlet lens, having a continuously varying index of refraction, which has been corrected to minimize at least third-order monochromatic aberrations.

2. Discussion of the Prior Art

By definition, an ideal optical lens will produce a faithful image of an object placed in its object plane. As a practical matter, however, all lenses suffer from monochromatic and chromatic aberrations which tend to impair the quality and resolution of images produced by the lens.

A monochromatic aberration is defined as an aberration which exists in a lens system for light of any specified color. Monochromatic aberrations are, thus, of prime concern where the object to be imaged is illuminated by light of a single color. On the other hand, chromatic aberrations are additional aberrations which appear when the object to be imaged is illuminated by light of more than one color, typically, by light of a plurality of colors, for example, ordinary white light.

Various mathematical techniques may be used to quantitatively define the monochromatic aberrations. The most commonly used technique utilizes the so-called "Third-Order Theory of Aberrations" in which the first two terms of a Maclaurin's theorem expansion for $\sin\theta$ are substituted in the geometrically derived ray-tracing formulas, based on Snell's Law.

Considering for the moment only monochromatic aberrations, the third-order theory permits the aberration of any ray passing through a lens, i.e., the deviation of the ray from the theoretical path predicted by the Gauss formulas, to be expressed in terms of five sums, $\sigma_1$ to $\sigma_5$, called the Seidel sums. If a lens is to be substantially free from third-order defects in its ability to form images of a given object, all five of these sums must simultaneously have values which are equal to 0.

Typically, a well corrected lens of conventional design is comprised of a plurality of elements, some of which may be cemented one to the other. For economic and other reasons, it would be advantageous to reduce the number of elements in the lens without a corresponding reduction of the quality of the lens.

Reduction of the number of elements may be accomplished by the use of aspheric surfaces, but this markedly increases the cost of the lens, as the aspheric surfaces must be hand figured.

As an alternative to the use of aspheric surfaces, we have found that the number of elements in a lens can be reduced by using glasses for the lens elements having continuously varying indices of refraction.

Actual elements which use glasses having a continuously varying refractive index have stimulated the curiosity of theoretical physicists for many years. However, it is only recently that the manufacture of such glasses has been attempted on a large scale.

The noted mathematician, James Clerk Maxwell, was probably the first person to discuss glasses with a continuously varying refractive index. Maxwell treated this subject strictly as an "interesting" mathematical problem. Considering a glass having an index distribution of the form:

$$N(r) = N_0/(1+(r/a)^2), \quad (1)$$

where,
r is the distance measured from a fixed point and a is a constant, Maxwell found that light rays traveling in such a glass would travel in paths which were circles. His result, the "Maxwell Fisheye Lens" was determined by geometry, although W. R. Hamilton had developed, several years before, algebraic methods which were suitable for solving such a problem.

It was not until 1905 that R. W. Wood investigated the possibilities of manufacturing glasses with a continuously varying index of refraction. In the second edition of *Physical Optics* he described procedures for preparing glasses with a cylindrical index distribution from gelatin soaked in a mixture of water and glycerine. Cylindrical distributions of refractive index are, of course, distributions which result in a continuous change of index in a direction which is perpendicular to the optical axis. The surfaces of constant index are accordingly cylinders whose axes coincide with the optic axis. Since the gradient of the index is normal to the optic axis, the term "radial gradient" may also be used to described a cylindrical index distribution.

An entirely different technique was employed by Schott who prepared similar cylinders of glass, by pouring the molten glass into iron tubes which were then suddenly cooled. The sudden chilling of the outer layer produced tension in the glass cylinder, and a corresponding variation in the refractive index of the glass. Plane parallel plates cut from the cylinder were found by Schott to act as concave lenses.

Through a series of approximations, Wood showed that the focal length of such a slab of glass is $f = -\frac{1}{2} N_1 t$, where $N_1$ is the second coefficient in the series expansion of the index in even powers of the distance Y from the axis ($N(Y) = N_0 = N_1 Y^2 + N \ldots$), and t the thickness of the slab.

Techniques for determining the third-order aberrations of symmetric systems with a continuously varying refractive index have been developed by R. K. Luneberg and H. A. Buchdahl. (See Robert K. Luneberg, *Mathematical Theory of Optics*, Berkeley, 1966, pp. 269–302 and H. A. Buchdahl, *Optical Aberration Coefficients*, New York, 1968, pp. 305–310. See also H. A. Buchdahl, An *Introduction to Hamiltonian Optics*, Cambridge, 1970); A symmetric system may be defined as a system that has both an axis of rotational symmetry, the optical axis, and a plane of symmetry which contains the optical axis. Luneberg and Buchdahl's results were derived from the calculus of variations based on Fermat's principle, but both Luneberg, whose results were based on cylindrical polar coordinates, and Buchdahl, whose work was based on a cartesian coordinate system, assumed that the system was symmetric and that the refractive index varied continuously from object to image, i.e., no interfaces between distinct media were allowed. It also followed from Hamiltonian optics that certain theorems frequently applied to symmetric systems, in which the glasses were homogeneous, were also applicable to systems in which the glasses were inhomogeneous. For example, the numbers of distinct third, fifth, and higher order aberration coefficients were the same in the two cases, and the familiar geometrical interpretation of these coefficients, and the effects of stop shifts on the coefficients will carry over unchanged to the case where the glasses were not homogeneous. Also the form of the paraxial invariant will be unchanged, and so on. The validity of these results depended only on the fact that the system was symmetric; the distribution of refractive index was otherwise arbitrary.

Other techniques to determine the aberrations on the basis of ray trace analyses have been published by L. Montognino and by E. W. Marchand. (See Lucian Montognino, "Ray Tracing in Inhomogenous Media," *Journal of the Optical Society of America*, LVIII (December, 1968), pp. 1667–1688; and Erich W. Marchand, "Ray Tracing in Gradient Index Media," *Journal of the Optical Society of America*, LX (January 1970), pp. The differential equation describing the path of a ray in the homogeneous medium was solved by numerical methods. This resulted in the total aberration of a given type, e.g., spherical aberration, coma, etc. but yielded no information about the contributions of each surface or thickness to the total.

Based on Buchdahl's results, equations have now been derived for the third-order aberration coefficients for any symmetric system with any number of discontinuities between isotropic media. It has, thus, been found that each of the third-order aberration coefficients of an isotropic symmetric system may be written in three parts: the sum of the ordinary surface contributions; an additional sum of surface contributions resulting from the inhomogeneous nature of either one or both of the media (called the inhomogeneous surface contribution); and, a sum due to a transfer of rays from one surface to the next through an inhomogeneous medium (called the inhomogeneous transfer contribution).

As previously discussed, practical applications of varying index glasses have heretofore been limited because of the unavailability of such media. However, E. G. Rawson, D. R. Herriott, and J. McKenna have discussed rods of radial index glasses for imaging at unit magnification. (See E. G. Rawson, D. R. Herriott and J. McKenna, "Analysis of Refractive Index Distributions in Cylindrical, Gradient Index Glass Rods," *Applied Optics*, IX (March 1970), pp. 753–759) They determined by ray trace analysis, the best distribution of index for on-axis imaging and the best for off-axis imaging and found that the two were significantly different. Such rods, called "GRINrods" (GRaded INdex) are interesting optical devices and may be used as lenses or as image relays, for example, in an optical communications system. See S. E. Miller, "Integrated Optics: An introduction," *Bell System Technical Journal*, 48 [7] 2059–69 (1969) and "Light Propagation in Generalized Lens-Like Media," *Bell System Technical Journal*, 44 [9] 2017–64 (1965). In the manufacture of such devices, the refractive index of a glass rod, for example, a sodium aluminosilicate, is altered by an ion exchange technique in which a large ion from a salt melt is exchanged for a smaller ion from the glass. More specifically, the glass to be altered is immersed in a LiNaSO$_4$ melt at, say, 675°C in a porcelain or alumina crucible, for a given period of time, for example, one hour. The glass is then slowly cooled to avoid the effects of thermal shock. The larger Na$^+$ ions in the glass are replaced by the smaller Li$^+$ ions from the melt, thereby altering the refractive index of the glass.

Similar changes can be effected by immersing a lithium aluminosilicate glass in an NaNO$_3$ melt. Again, the larger Na$^+$ ion replaces the smaller Li$^+$ ion in the glass. Similar results have been obtained with a K$^+$ for Li$^+$ or a K$^+$ for Na$^+$ exchange.

Deutsches Patentschrift 1,191,980, which issued Dec. 23, 1965, discloses another technique whereby the index of refraction of a glass may be altered. According to that patent, silver, or an alkali metal, is deposited onto the surface of a slab of optical glass and overlayed by graphite electrodes. Next, a d.c. potential of about 120 volts is applied to the electrodes and the glass heated to 300°–400°C. After about 10 minutes, all the metal ions are found to have migrated into the glass, altering its refractive index.

Similarly, U. S. Pat. No. 3,486,808, which issued Dec. 30, 1969 to D. P. Hamblen, discloses another technique for producing a refraction index gradient by contacting a borate or alkali silicate glass with a molten salt containing silver or thallium cations. As before, there is in this process a replacement of the interstitial ion with a counter-ion possessing a large degree of polarization. This patent also teaches that the index of refraction of an alumina lens preform may be decreased by contacting a sapphire matrix with vapors of magnesium oxide to produce a diffused portion in the preform which contains an alumina-magnesia spinel. The spinel has a lower index of refraction than the sapphire matrix and is soluble in the matrix, forming a refractive index gradient increasing inwardly from the surface of the preform. See also U. S. Pat. No. 3,212,401 which issued to Navias on Oct. 19, 1965.

SUMMARY OF THE INVENTION

According to our invention, simple lens systems have been designed in which gradients of various types are introduced into the glasses and third-order monochromatic aberrations substantially reduced. Illustrative designs include a singlet having an axial gradient and corrected for both spherical aberration and coma; and a singlet with a radial gradient which is an aplanat and free of third-order astigmatism and distortion. As used herein, an index distribution is said to be "axial" if the gradient is always parallel to the optical axis. Thus, the surfaces of constant index are planes normal to the axis. On the other hand, an index distribution is said to be "radial" if the gradient is perpendicular to the optical axis and the resulting surfaces of constant index are cylinders concentric about the optical axis.

DESCRIPTION OF THE DRAWINGS

FIG. 1 is a graph depicting the path of an axial ray in a Wood lens;

FIG. 5 is a graph depicting astigmatism and distortion for ramp-axial gradients;

FIG. 6 is a graph depicting spherical and comatic aberrations for exponential-axial gradients;

FIG. 7 is a graph depicting astigmatism and distortion for exponential-axial gradients;

FIG. 8 is a graph depicting the double graphing of a singlet with a radial gradient;

FIGS. 9–13 graph various solutions for the parameters of a radial gradient singlet, as a function of the lens thickness;

FIGS. 14–18 graph various solutions for the parameters of a radial gradient singlet, as a function of First Curvature;

FIG. 19 depicts a singlet lens with an axial gradient and illustrates the terminology used in the specification.

DETAILED DESCRIPTION OF THE INVENTION

Figure 2:
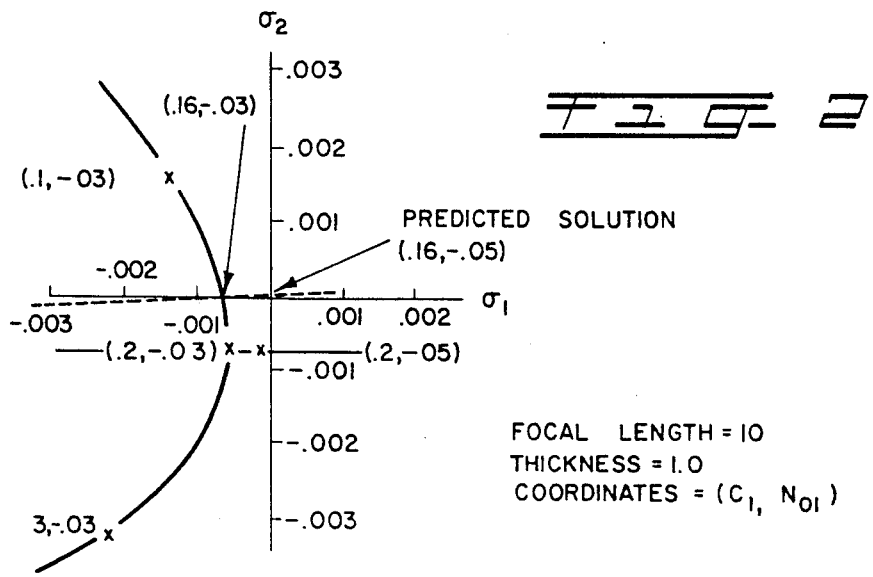
FIG. 2 is a graph depicting the double graphing of an aplanatic singlet with an axial gradient.

According to Fermat's Principle, rays traversing any optical system are characterized by the fact that the integral $V$, given by the equation $$V = \int_a^b N ds \qquad (2)$$

has a stationary value for the actual ray between $a$ and $b$ where $N$ is the index and a function of position. Therefore, $$\delta \int N ds = 0 \qquad (3)$$

Equation (3) can be written in a form appropriate to cartesian coordinates, and assuming that the optical axis is in the positive $x$ direction, then $$\delta \int N(x,\xi)(1+\dot{Y}^2+\dot{Z}^2)^{1/2} dx \qquad (4)$$

where, $\xi = Y^2 + Z^2$ and the Lagrangian can now be defined as, $$L = N(x,\xi)(1+\dot{Y}^2+\dot{Z}^2)^{1/2} \qquad (5)$$

For the path of the ray to be a minimum the Euler-Lagrange equations must hold, and therefore, $$(d/dx)(\delta L/\delta \dot{Y}) - (\delta L/\delta Y) = 0 \qquad (6)$$

$$(d/dx)(\delta L/\delta \dot{Z}) - (\delta L/\delta Z) = 0 \qquad (7)$$

Performing the necessary operations on $L$, substituting into equation (6) and combining equations (6) and (7) into vector notation the differential equation of the ray becomes, $$(\delta N/\delta X)(1+\dot{Y}^2)\dot{Y} + N(x,\xi)\ddot{Y} - (1+\dot{Y}^2)(\delta N/\delta Y) = 0 \qquad (8)$$

Two special cases of Equation (8) are of interest. The first is that for a glass which has an axial gradient, i.e., the index is independent of distance from the optical axis. This assumption leads to the simple equation, $$(\delta N/\delta X)(1+\dot{Y}^2)\dot{Y} + N(x,\xi)\ddot{Y} = 0 \qquad (9)$$

On the other hand, if the glass has a radial gradient, equation (8) becomes, $$N(Y)\ddot{Y} - (1+\dot{Y}^2)(\delta N/\delta Y) = 0 \qquad (10)$$

The first of these forms has been solved in some detail by E. W. Marchand, although a cylindrical polar coordinate system was used. Ray tracing using the radial gradients has also been done, again in cylindrical polar coordinates. Although the method for tracing real rays has been published, the simple case of paraxial rays has not been explicitly considered for either class of index gradients. Paraxial ray tracing is very important since the third-order aberration coefficients are determined from the data obtained by tracing two paraxial rays.

These two paraxial rays are chosen, without loss of generality, to be the axial or $a$ ray from the foot of the object and passing through the edge of the aperture stop, and the chief or $b$ ray from the top of the object and passing through the center of the aperture stop. The height of either of the rays, $y_a(x)$ (or, $y_b(x)$ ), and direction, $v_a(x)$ (or, $v_b(x)$ ), is simply the derivative evaluated at the same point. $v_a(x) = \dot{y}_a(x)$, etc.

After Buchdahl, $Y(x)$, the real ray height, at any point in a lens system can be written as an expansion in terms of the height, $T$, of the ray on the object plane, and the height, $S$, of the same ray at the entrance pupil. For paraxial optics, the ray height is linear in $S$ and $T$.

$$Y(x) = y_a(x) S + y_b(x) T \qquad (11)$$

To solve Equations (8), (9) or (10) for paraxial rays, all that remains is to determine the functional form of the index in the inhomogeneous media. Here, and throughout the patent, the index will be defined in terms of $x$ and $Y$, rather than $\xi (\xi = Y^2 + Z^2)$ since rotational symmetry is assumed and only meridonal rays need be traced. Therefore, for meridonal rays the index is written as a power series in $Y$, the distance measured perpendicular from the optical axis. That is, $$N(x,Y) = N_0(x) + N_1(x)Y^2 + N_2(x)Y^4 + \ldots \qquad (12)$$

For the radial gradient case, this simply becomes:

$$N(Y) = N_0 + N_1 Y^2 + N_2 Y^4 + \ldots \qquad (13)$$

where the coefficients, $N_n$, are constants.

In the most general case in which the index is a function of both $x$ and $Y$, each of the coefficients of Equation (12) is written in a power series of $x$:

$$N_0(x) = N_{00} + N_{01} x + N_{02} x^2 + \ldots \qquad (14)$$

$$N_1(x) = N_{10} + N_{11} x + N_{12} x^2 + \ldots \qquad (15)$$

$$N_2(x) = N_{20} + N_{21} x + N_{22} x^2 + \ldots \qquad (16)$$

The convergence of each of these series must be checked for each case by computing the paraxial invariant at each surface. This is discussed in more detail here below. For the axial gradient, case, the expansion for $N$ reduces to $$N(x) = N_{00} + N_{01} x + N_{02} x^2 \qquad (17)$$

Aberration Polynomial

Third-order aberration theory is based upon the difference of the real ray, $Y,Z$ and the ideal ray coordinates, $my, mz$ in the image plane. That is, $$\epsilon_y = Y - my \qquad (18)$$

$$\epsilon_z = Z - mz \quad (19)$$

The generic form of the dependence of $\epsilon$ on the ray coordinates is well discussed in the literature and is defined for any rotationally symmetric system, $$\epsilon_y' = \sigma_1 \rho^3 \cos\theta + \sigma_2 \rho^2 h'(2+\cos 2\theta) + (3\sigma_3 + \sigma_4)\rho h'^2 \cos\theta + \sigma_5 h'^3 \quad (20)$$

$$\epsilon_z' = \sigma_1 \rho^3 \sin\theta + \sigma_2 \rho^2 h' \sin 2\theta + (\sigma_3 + \sigma_4)\rho h'^2 \sin\theta, \quad (21)$$

where $h'$ is the image height and $\rho$ and $\theta$ are the polar coordinates in the entrance pupil, ($S_y = \rho\cos\theta, T_y = \rho\sin\theta$), where $\sigma_1$ equals the coefficient of third-order spherical aberration, $\sigma_2$ equals the coefficient of coma, $\sigma_3$ equals the coefficient of astigmatism, $\sigma_4$ equals the coefficient of Petzval's field curvature, and $\sigma_5$ equals the coefficient of distortion. It follows from Hamilton's method that the aberration polynomial, as Equation (20) is called, has the same generic form for either homogeneous or inhomogeneous symmetric systems. The only change that occurs is in the formulas needed to compute the $\sigma_n$'s. As stated in the paper entitled, "The Third-Order Aberrations of Inhomogeneous Lens," by P. J. Sands, J.O.S.A., Vol. 60, November 1970, these are given by:

$$\sigma_i = \mu \sum_j a_{ij} + \mu \sum_j a_{ij}^* \quad (22)$$

where $\mu = -1/N_k v'_{ak}$ and $v_{ak}'$ is the direction of the axial ray in the image space $$a_1 = a + K y_a^4 \quad (23)$$

$$a_2 = qa + K y_a^3 y_b \quad (24)$$

$$a_3 = q^2 a + K y_a^2 y_b^2 \quad (25)$$

$$a_4 = (1/2)\lambda a2C\Delta(1/N_0) \quad (26)$$

$$a_5 = q^3 a + a_4 + K y_a y_b^3 \quad (27)$$

where, $$q = i_b/i_a, a = (1/2)N_0(N_0/N_0' - 1)y_a i_a^2(i_a + v_a'), \quad (28)$$

and $K = -C\Delta(2N_1 + (1/2)CN_0)$. The $i_a, i_b, C$ and $\lambda$ are the angles of incidence of the $a$ and $b$ rays, the curvature, and the paraxial invariant, respectively. The transfer contributions are $$a^*_1 = 1/2 \nabla N_0 y_a v_a^3 + \int [4N_2 y_a^4 + 2N_1 y_a^2 v_a^2 - (1/2)N_0 v_a^4]dx \quad (29)$$

$$a^*_2 = 1/2 \nabla N_0 y_a v_a^2 v_b + \int [4N_2 y_a^3 y_b + N_1 y_a v_a(y_a v_b + y_b v_a) - 1/2 N_0 v_a^3 v_b]dx \quad (30)$$

$$a^*_3 = 1/2 \nabla N_0 y_a v_a v_b^2 + \int [4N_2 y_a^2 y_b^2 + 2N_1 y_a y_b v_a v_b - 1/2 N_0 v_a^2 v_b^2]dx \quad (31)$$

$$a^*_4 = \lambda^2 \int (N_1/N_0^2)dx \quad (32)$$

$$a^*_5 = \frac{1}{2}\nabla N_0 y_a v_b^3 + \int [4N_2 y_a y_b^3 + N_1 y_b v_b(y_a v_b + y_b v_a) - \frac{1}{2} N_0 v_a v_b^3]dx \quad (33)$$

The inhomogeneous surface contribution is similar in form to the surface contribution due to an asphere. To calculate the surface contributions, all that is required are the values of the height and direction of the axial and chief rays at each surface; however, to evaluate the transfer contribution, the functional form of the path (both height and direction) of the two rays must be known.

The Wood Lens

In R. W. Wood's *Physical Optics*, a lens is proposed which is a plane parallel slab of glass with an index variation radially outward from the optical axis. Wood notes that, depending on whether the index is greater on the optical axis than the edge, or vice versa, the slab acts as a converging or diverging lens. He goes on to say that the condition for an image to be formed is that $N(Y) = N_0 + N_1 Y^2$, where $Y$ is the perpendicular distance from the optical axis and the focal length of such a lens of thickness, $t$, is $-1/2N_1 t$. Although an image is formed by a distribution of this type, it will not necessarily be free from aberrations. In order to form an axial image, free of third-order spherical aberration, another degree of freedom is needed. According to the invention, the coefficient of the next term, $N_2$, in the expansion of $N(Y)$ is chosen. One skilled in the art will appreciate that if the work were to be carried further to correct for fifth order-spherical aberration, the $N_3$ term could be used and so forth.

Condition for Perfect Axial Imagery

Irrespective of the conjugates, the condition for a perfect axial image is, from FIG. 1

$$V'_2 = -(Y_2/L') \quad (34)$$

that is, that all rays exiting from the slab at height $Y_2$ and having direction $V'_2$ (after refraction) must pass through the axis at a distance $L'$ from the slab. At the interface of the glass and air, $V'_2$ is related to the direction tangent, $V_2$, just inside the slab by Snell's law. Thus, $N(Y) \sin u_2 = \sin u'_2$ and $$(N(Y)^2 \tan^2 u_2/1 + \tan^2 u_2) = (\tan^2 u'_2/1 + \tan^2 u'_2) \quad (35)$$

But $V'_2 = \tan u'_2$, and therefore, $$(N(Y)^2 V_2^2/1 + V_2^2) = (V'^2_2/1 + V'^2_2) \quad (36)$$

Solving Equation (36) for $V'_2$, $$V'_2 = [N(Y) V_2/(1 + V_2^2 - N(Y)^2 V_2^2)^{1/2}] \quad (37)$$

Therefore, the condition of Equation (34) is, inside the glass, $$[N(Y) V_2/(1 + V_2^2 - N(Y)^2 V_2^2)^{1/2}] + (Y_2/L') = 0 \quad (38)$$

The direction tangent, $V_2$, at the second interface and $Y_2$ are given by the functions $\dot{Y}(x)$ and $Y(x)$ respectively evaluated at the thickness $x = t$. All that remains is to determine the functional form of $Y(x)$ and its derivative. From Equations (11) and (12), $$N(Y) = N_0 + N_1 Y^2 + N_2 Y^4 + \ldots \quad (39)$$

$$Y(x) = y_a(x) S + y_b(x) T + \ldots \quad (40)$$

Hence, $$\dot{Y}(x) = \dot{y}_a(x) S + \dot{y}_b(x) T + \ldots \quad (41)$$

where the S and T are the coordinates on the entrance pupil and object, respectively. Expanding Equation (38) by the binomial expansion gives:

$$N(Y)\ddot{Y}(b) - [N(Y)\dot{Y}(b)^3/2] + [N(Y)^3\dot{Y}(b)^3/2] + [Y(b)/L'A] = 0 \quad (42)$$

Substituting Equations (39) and (40) into Equation (42), saving only first-order terms in $S$ and $T$ and equating the coefficients of each power of $S$ and $T$ gives:

$$S N_0 \ddot{y}_a(b) + [y_a(b)/L'] = 0 \quad (43)$$

$$T N_0 \ddot{y}_b(b) + [y_b(b)/L'] = 0 \quad (44)$$

The $y_a(x)$ and the $y_b(x)$ are, from Equations (21) and (22), the paraxial coefficients and are for a radial distribution, $$y_a(x) = C_1 e^{2\alpha x} + C_2 e^{-2\alpha x} \quad (45)$$

$$y_b(x) = C_3 e^{2\alpha x} + C_4 e^{-2\alpha x} \quad (46)$$

where, $\alpha = \sqrt{N_1/2N_0}$ and the $C_n$'s are determined from the initial starting data for the two paraxial rays. These are given by, $$C_1 = (y_{aj}/2) + (v_{aj}/4\alpha N_0) \quad (47)$$

$$C_2 = (y_{aj}/2) - (v_{aj}/4\alpha N_0) \quad (48)$$

$$C_3 = (y_{bj}/2) + (v_{bj}/4\alpha N_0) \quad (49)$$

$$C_4 = (y_{bj}/2) - (v_{bj}/4\alpha N_0) \quad (50)$$

where $y_{aj}$, $v_{aj}$ are the height and direction measured with respect to the optical axis of the axial ray incident on the slab and $y_{bj}$, $v_{bj}$ are the height and direction of the chief ray incident on the slab.

Substituting Equation (45) into Equation (43) gives:

$$\alpha = -\frac{1}{2N_0 L'} \left| \frac{C_1 e^{2\alpha b} + C_2 e^{-2\alpha b}}{C_1 e^{2\alpha b} - C_2 e^{-2\alpha b}} \right| \quad (51)$$

If Equation (51) is satisfied, then an image is formed at a point $L'$ from the back surface. (Since $T = 0$ for an axial object, the terms involving $T$ are not of interest). Equation (51) is a transcendental equation for $\alpha$ and, therefore, must be solved by numerical techniques. However, one more consideration must be taken into account. If $N_1$ is negative, $\alpha$ becomes imaginary. By looking at the wavefronts and remembering that Fermat's principle must hold, it is obvious that for a positive lens $N_1$ must be negative and for a negative lens $N_1$ must be positive. Equation (51) can be solved readily when $N_1$ is positive but for negative values of $N_1$, let $\alpha = \alpha' i$ where $\alpha'$ is real. Therefore, $$\alpha' i = -\frac{1}{2N_0 L'} \frac{C_1 e^{2\alpha' b i} + C_2 e^{-2\alpha' b i}}{C_1 e^{2\alpha' b i} - C_2 e^{-2\alpha' b i}} \quad (52)$$

$$\alpha' = \frac{1}{2N_0 L'} \frac{y_a \cos 2\alpha' b + \frac{v_a}{2\alpha' N_0} \sin 2\alpha' b}{y_a \sin 2\alpha' b - \frac{v_a}{2\alpha' N_0} \cos 2\alpha' b} \text{ for } N_1 < 0 \quad (53)$$

Rewriting Equation (51), $$\alpha = -\frac{1}{2N_0 L'} \frac{y_a \cos h2\alpha b + \frac{v_a}{2\alpha N_0} \sin h2\alpha b}{y_a \sin h2\alpha' b + \frac{v_a}{2\alpha N_0} \cos h2\alpha b} \text{ for } N_1 > 0 \quad (54)$$

For a slab of given thickness, $b$, and of base index, $N_0$, and given the location of the object, the value of $\alpha$, and therefore, of $N_1$, can be determined such that the back focal distance is $L'$.

Equations (53) and (54) have been solved for various conjugates and the results are presented in Table I, below.

TABLE I
INDEX DISTRIBUTIONS FOR THE WOOD LENS

| Object Distance | Thickness of slab | Image Distance | Axial Index | Value of N(1) | Value of N(2) |
|---|---|---|---|---|---|
| infinite | 1.000 | −100.00 | 1.500000 | 0.005011 | −0.000000 |
| infinite | 1.000 | −050.00 | 1.500000 | 0.010045 | −0.000001 |
| infinite | 1.000 | −010.00 | 1.500000 | 0.051131 | −0.000176 |
| infinite | 1.000 | −002.50 | 1.500000 | 0.219107 | −0.014349 |
| infinite | 1.000 | 2.50 | 1.500000 | −0.183424 | 0.007509 |
| infinite | 1.000 | 10.00 | 1.500000 | −0.048908 | 0.000149 |
| infinite | 1.000 | 50.00 | 1.500000 | −0.009956 | 0.000001 |
| infinite | 1.000 | 100.00 | 1.500000 | −0.004989 | 0.000000 |
| −40.00 | 1.000 | 10.00 | 1.500000 | −0.036064 | 0.000145 |
| −20.00 | 1.000 | 10.00 | 1.500000 | −0.023076 | 0.000125 |
| −08.00 | 1.000 | 10.00 | 1.500000 | 0.016760 | −0.000218 |
| −04.00 | 1.000 | 10.00 | 1.500000 | 0.086184 | −0.003062 |
| −02.00 | 1.000 | 10.00 | 1.500000 | 0.237331 | −0.031119 |
| 2.00 | 1.000 | 10.00 | 1.500000 | −0.278570 | 0.014309 |
| 4.00 | 1.000 | 10.00 | 1.500000 | −0.169914 | 0.002319 |
| 8.00 | 1.000 | 10.00 | 1.500000 | −0.111058 | 0.000455 |
| infinite | 0.100 | 10.00 | 1.500000 | −0.498891 | 0.001607 |
| infinite | 0.250 | 10.00 | 1.500000 | −0.198894 | 0.000635 |
| infinite | 0.500 | 10.00 | 1.500000 | −0.098899 | 0.000311 |
| infinite | 1.000 | 10.00 | 1.500000 | −0.048908 | 0.000149 |
| infinite | 2.000 | 10.00 | 1.500000 | −0.023927 | 0.000069 |

Third-Order Condition

The condition for a paraxial image to be formed has resulted in a functional form for $\alpha$ and therefore, a $N_1$ can be found which will result in an image being formed at any point. In order to form an axial image free of third-order spherical aberration, the third-order term of $S$ must be added to Equation (11). Therefore, $$Y(x) = y_a(x)S + y_b(x)T + P(x)S^3 \quad (55)$$

Substituting $Y(x)$ into Equation (10) and saving only terms involving $S^3$ gives:

$$\ddot{P}(x) - (2N_1/N_0) P(x) + (N_1/N_0) y_a(x)^2 \ddot{y}_a(x) - (4N_2/N_0) y_a^3(x)$$

$$- (2N_1/N_0) y_a(x) \dot{y}_a(x)^2 = 0 \quad (56)$$

where, the $y_a(x)$ has been determined from the paraxial approximations. The solution of Equation (56) is easily found, although it is somewhat long:

$$P(x) = D_1 e^{2\alpha x} + D_2 e^{-2\alpha x} + A_1 e^{6\alpha b} + A_2 x e^{2\alpha x} + A_3 x e^{-2\alpha x} + A_4 e^{-6\alpha b} \quad (57)$$

where the constants are functions of $N_2$ and are given by:

$$A_1 = (\beta^2 + \alpha^4/4\alpha^2) C_1^3 \quad (58)$$

$$A_2 = -(10\alpha^4 - 6\beta^2/\alpha) C_1^2 C_2 \quad (59)$$

$$A_3 = (10\alpha^4 - 6\beta^2/\alpha) C_1 C_2^2 \quad (60)$$

$$A_4 = (\beta^2 + \alpha^4/4\alpha^2) C_2^3 \quad (61)$$

$$D_1 = (4\alpha A_4 - 8\alpha A_1 - A_2 - A_3 + A_5)/4\alpha \quad (62)$$

$$D_2 = (4\alpha A_1 - 8\alpha A_4 + A_2 + A_3 - A_5/4\alpha) \quad (63)$$

and, $$A_5 = (\dot{y}_a^3(0)/2N_0^3) - (\dot{y}_a^3(0)/2N_0) - (1N_1/N_0) y_a^2(0)\dot{y}_a(0) \quad (64)$$

where, $$\alpha^2 = (N_1/2N_0) \text{ and } \beta^2 = (N_2/2N_0) \quad (65)$$

To determine the third-order condition for perfect axial imaging the expansion of Equation (55) substituted into Equation (42) and the third-order axial boundary condition is:

$$\dot{P}(b) + \frac{P(b)}{N_0 L'} + \frac{N_1 y_a(b)^2}{N_0} \dot{y}_a(b) - \frac{\dot{y}_a^3(b)}{2}(1+N_0^2) = 0 \quad (66)$$

Differentiating Equation (57) and substituting $\dot{P}(b)$ and $P(b)$ into Equation (66), an expression for $N_2$ can be determined in terms of thickness, $N_1$, the base index and the location of the object. Therefore, $$\beta^2 = Q_1/Q_2 \quad (67)$$

where, $$\beta^2 = N_2/2N_0$$

$$Q_1 = -3\alpha^3[R_1^3 S_1 + 3R_1^2 R_2 S_2 + 3R_1 R_2^2 S_1 + R_2^3 S_2]$$
$$- (\alpha^2/2N_0 L')[R_1^3 S_2 + 3R_1^2 R_2 S_1 + 3R_1 R_2^2 S_2 + R_2^3 S_1]$$
$$- A_5 S_4 - (A_5/2\alpha N_0 L') S_3$$
$$+ \alpha^3[21 R_1^3 S_3 + 9R_1^2 R_2 S_4 - 17 R_1 R_2^2 S_3 + 3R_2^3 S_4]$$
$$+ 40\alpha^4 b[R_1^3 S_4 + R_1^2 R_2 S_3 - R_1 R_2^2 S_4 - R_2^3 S_3]$$
$$+ (\alpha^2/2N_0 L')[R_1^3 S_4 - 11 R_1^2 R_2 S_3 + 3R_1 R_2^2 S_4 + 23 R_2^3 S_3]$$
$$+ (20\alpha^3 b/N_0 L)[R_1^3 S_3 + R_1^2 R_2 S_4 - R_1 R_2^2 S_3 - R_2^3 S_4]$$
$$- 32\alpha^3 [R_1^3 S_3 + R_1^2 R_2 S_4 - R_1 R_2^2 S_4]$$
$$- 8N_0^2 \alpha^3 [R_1^3 S_1 + 3R_1^2 R_2 S_2 + 3R_1 R_2^2 S_1 + R_2^3 S_2]$$
$$+ 24 N_0^2 \alpha^3 [R_1^3 S_3 + R_1^2 R_2 S_4 - R_1 R_2^2 S_3 - R_2^3 S_4] \quad (68)$$

and, $$Q_2 = (3/\alpha) [R_1^3 S_1 + 3R_1^2 R_2 S_2 + 3R_1 R_2^2 S_1 + R_2^3 S_2]$$
$$+ (1/2\alpha^2 N_0 L') [R_1^3 S_2 + 3R_1^2 R_2 S_1 + 3R_1 R_2^2 S_2 + R_2^3 S_1]$$
$$+ (1/\alpha) [11 R_1^3 S_3 - 9R_1^2 R_2 S_4 - 15 R_1 R_2^2 S_3 - 3R_2^3 S_4]$$
$$+ 24b [R_1^3 S_4 + R_1^2 R_2 S_3 - R_1 R_2^2 S_4 - R_2^3 S_3]$$
$$- (1/2N_0 L'\alpha^2) [R_1^3 S_4 + 21 R_1^2 R_2 S_3 + 3R_1 R_2^2 S_4 - 9R_2^3 S_3]$$
$$+ (12b/N_0 L'\alpha) [R_1^3 S_3 + R_1^2 R_2 S_4 - R_1 R_2^2 S_3 - R_2^3 S_4] \quad (69)$$

where, $$R_1 = y_a(0)/2, R_2 = \dot{y}_a(0)/4\alpha N_0$$

$$S_1 = (e^{6ab} - e^{-6ab}/2), S_2 = (e^{6ab} + e^{-6ab}/2)$$

$$S_3 = e^{2ab} - e^{-2ab}/2), S_4 = (e^{2ab} + e^{-2ab}/2)$$

This expression, along with Equation (53) and Equation (54) have been solved with the aid of a computer and the resulting $N_1$ and $N_2$ have been found for various object and image distances. There are listed in Table I, above.

One skilled in the art will appreciate that the techniques disclosed herein can be extended to eliminate fifth, seventh, etc. order spherical aberrations by using $N_3$, $N_4$, etc.

Thin Lens Approximation

It is often valuable in lens design problems to consider the properties of a thin lens since it often provides important information about the system and these approximate formulas are usually easier to manipulate.

From Equation (51):

$$\alpha = -\frac{1}{2N_0 L'} \left[ \frac{C_1 e^{2ab} + C_2 e^{-2ab}}{C_1 e^{2ab} - C_2 e^{-2ab}} \right] \quad (70)$$

For an infinitely distant object ($v_a = 0$), $$\alpha = -\frac{1}{2N_0 L'} \left[ \frac{e^{2ab} + e^{-2ab}}{e^{2ab} - e^{-2ab}} \right] \quad (71)$$

Expanding the exponents in the power series for $b$ and saving terms up to the second order in $b$, gives $$-4N_0 L'\alpha^2 b = 1 + 4\alpha^2 b^2 \quad (72)$$

Since $\alpha^2 = N_1/2N_0$, $$N_1 = -[1(2L'b + 2b^2/N_0)] \quad (73)$$

If the image distance is large compared to the thickness of the slab, $$N_1 = -(1/2L'b) \quad (74)$$

Results of the Wood Lens

Table I, above, lists the results of the calculation of $N_1$ and $N_2$ such that the system has a prescribed back focal length and is corrected for third-order spherical aberration. The most significant part of this result is that the order of magnitude of $N_1$ is not outside the range available under current techniques for manufacturing a lens with a radial index gradient. It is, therefore, possible to manufacture a Wood lens of back focal distance 10 cms and a radius of two centimeters.

The magnitude of $N_2$ is of some interest since it represents the variation from the parabolic function that Wood predicted. The value of $N_2$ is two orders of magnitude less than $N_1$ and, therefore, only a small correction of the index distribution is required to eliminate third-order spherical aberration.

Presupposing the results to be demonstrated later, the aberration coefficients have been computed for an ordinary lens bent for minimum spherical aberration, a Wood lens not corrected for spherical aberrations ($_2 = 0$), and a Wood lens corrected for a third-order spherical aberration ($N_2 = +.000145$). The lenses are of equal focal length and field angle but they differ significantly in their aberrations. It is seen in Table II, below, that the simple uncorrected Wood lens is better with respect to spherical aberration. The addition of $N_2$ so as to correct the spherical aberration to zero makes little difference to the other third-order aberrations. It is also evident that coma is an order of magnitude larger in the Wood lens as compared to the ordinary lens. This is, of course, important but the Wood lens still has two bendings left with which to correct coma, or another aberration. As will be demonstrated below, bending is utilized with surprising results.

TABLE II

COMPARISON OF WOOD LENS AND ORDINARY SINGLET

|  | Ordinary Lens Bend for Minimum S.A. | Wood Lens $N_2 = 0$ | Wood Lens Corrected for S.A. ($N_2 = -0.000145$) |
|---|---|---|---|
| Focal Length | 10 | 10 | 10 |
| f/no. | 5.0 | 5.0 | 5.0 |
| Gaussian Image ht. | 3.1 | 3.1 | 3.1 |
| Thickness | 1.0 | 1.0 | 1.0 |
| Spherical Aberration ($\times 10^{-6}$) | $-776$ | $-558$ | $-1$ |
| Coma ($\times 10^{-4}$) | $+206$ | $1588$ | $1639$ |
| Astigmatism ($\times 10^{-4}$) | $-4268$ | $-3950$ | $-3944$ |
| Field Curvature ($\times 10^{-4}$) | $-2790$ | $-1680$ | $-1680$ |
| Distortion ($\times 10^{-4}$) | $-686$ | $6808$ | $6808$ |

The General Paraxial Ray Trace

To derive the general paraxial ray trace equation, we begin with Equation (75) below.

$$(\delta N/\delta x)(1+\dot{Y}^2)\dot{Y} + N(x,Y)\ddot{Y} - (1+\dot{Y}^2)(\delta N/\delta Y) = 0 \quad (75)$$

where, $N(x,Y) = N_0(x) + N_1(x)Y^2 + N_2(x)Y^4$ and the $N_n(x)$ are given by Equations (14)–(16). It has already been seen that the $Y(x)$ can be written paraxially in the form:

$$Y(x) = y_a(x)S + y_b(x)T \quad (76)$$

Hence, $$\dot{Y}(x) = \dot{y}_a(x)S + \dot{y}_b(x)T \text{ and,} \quad (77)$$

$$\ddot{Y}(x) = \ddot{y}_a(x)S + \ddot{y}_b(x)T \quad (78)$$

Substituting Equation (76) into Equation (75) the coefficient of $S^1$ gives:

$$\ddot{y}_a(x)(N_{00} + N_{01}x + N_{02}x^2 + \ldots)$$
$$+ \dot{y}_a(x)(N_{01} + 2N_{02}x + \ldots)$$
$$-2y_a(x)(N_{10} + N_{11}x + N_{12}x^2 + .) = 0 \quad (79)$$

To solve Equation (79) for $y_a(x)$, the paraxial height in any isotropic medium, let $$y_a(x) = \sum_{n=0}^{\infty} A_n x^n$$

Therefore, $$\dot{y}_a(x) = \sum_{n=0} (n+1) A_{n+1} x^n$$

$$\ddot{y}_a(x) = \sum_{n=0} (n+2)(n+1) A_{n+2} x^n \quad (80)$$

Substituting these into Equation (79) gives:

$$\left[\sum_{n=0}^{\infty} (n+2)(n+1) A_{n+2} x^n\right][N_{00} + N_{01}x + N_{02}x^2 \ldots]$$
$$+ \left[\sum_{n=0}^{\infty} (n+1) A_{n+1} x^n\right][N_{01} + 2N_{02}x + 3N_{03}x^2 \ldots]$$
$$-2 \left[\sum_{n=0}^{\infty} A_n x^n\right][N_{10} + N_{11}x + N_{12}x^2 + \ldots] = 0 \quad (81)$$

Now equating the coefficients of the various powers of $x$ in this identity gives:

$$2A_2 N_{00} + A_1 N_{01} - 2A_0 N_{10} = 0 \quad (82)$$

and from the $x1$ term:

$$6A_3 N_{00} + 2A_2 N_{01} - 2A_1 N_{10} + 2A_2 N_{01} + 2A_1 N_{02} - 2A_0 N_{11} = 0 \quad (83)$$

and so on. In general, $$A_m = \left(\sum_{n=2}^{m-1} [2A_{n-2} N_{1,m-n} - n(n-1) A_n N_{0,m-n} - (m-n+1)(n-1); A_{n-1} N_{0,m-n+1}] - (m-1) A_{m-1} N_{01} + 2A_{m-2} N_{10}\right)/(m)(m-1) N_{00} \quad (84)$$

which constitutes a recursion relation for the $A_n$'s. Equation (84) is very easily programmed for a computer. Given the index distribution, the coefficients, $A_m$, are found and then the power series for the paraxial height of the ray is determined. Therefore, $$y_a(x) = A_0 + A_1 x + A_2 x^2 + \cdots \quad (85)$$

$$\dot{y}_a(x) = A_1 + 2A_2 x + 3A_3 x^2 \cdots \quad (86)$$

It is self evident that $A_0$ is the initial height of the ray and $A_1$ its direction with respect to the optical axis immediately after refraction into the medium. The same procedure is followed to obtain an expression for $y_b(x)$.

To trace a ray through an optical system, the initial height and the direction of two rays on the first surface are needed. The direction after refraction is determined by Snell's law, taking into account the curvature of the surface and using $N_{00}$ and $N_{00}|$ as the refractive indices. When the angle and height inside the surface are found, the power series of the two rays is calculated as well as its derivatives. To check the convergence of these power series, the paraxial optical invariant, $\lambda$, is calculated at each surface. The optical invariant is $\lambda$ given by:

$$\lambda = N(x)[y_a(x)\dot{y}_b(x) - y_b(x)\dot{y}_a(x)] \quad (87)$$

Therefore, by evaluating each of the power series, $y_a$, $y_b$, $\dot{y}_a$, and $\dot{y}_b$ at $x = 0$ and at $x = t$, the invariant at the two surfaces can be calculated. If the two values of the invariant are identical, then the series have converged. Having found convergence for the first thickness, the ray trace of the two rays is continued by applying Snell's law at the interface and obtaining the refracted directions and heights. Now the power series in the next medium is found, and the optical invariant calculated. This procedure is followed through the system and holds whether a medium is homogeneous or inhomogeneous.

By the use of an appropriately programmed digital computer, the ray tracing may be readily performed and any desired degree of accuracy can be obtained by simply adding more terms to the expansion of $y(x)$ for each ray, if the series converges. More important than ease of computer calculation, is the fact that the functional forms of the coordinates $y_a(x)$ and $y_b(x)$ may be found. This means that the third-order aberrations can now be easily calculated using equations (23)–(27) and (29)–(33). By taking the resulting power series of $y_a(x)$ and $y_b(x)$ and their derivatives $v_a(x)$ and $v_b(x)$, multiplying the various power series together, and integrating, the transfer contribution from Equations (29)–(33) can be evaluated. The surface contribution is found by evaluating the height $y$ and direction $v$ of the $a$ and $b$ rays at each surface. Thus, the total third-order aberration of each type can be determined.

The previously developed method for the calculation of the third-order aberration coefficients require only that the power series for the paraxial ray height and directions converge. This is easily checked by calculating the paraxial invariant at each surface. If it changes, the power series is not accurate enough.

Some Illustrative Examples of Gradient Index Optics

Having developed the theory, and having reduced the formulas for aberration coefficients in a medium which has a continuously varying index of refraction to a form which is easily computed, in a digital computer, some examples are given to illustrate the use of index gradients in correcting various third-order aberrations. Although the systems chosen are rather simple, in that they are only of one or two elements, the potential of the use of refractive index gradients is dramatically illustrated.

Before the examples are discussed, it is necessary to describe the technique which is used to correct the desired aberrations. With the use of digital computers in automatic lens correction, graphical techniques are seldom used; however, in investigating new parameters, as is being done here, it is very valuable to plot the effects of each parameter to determine the dependence of the aberrations on these new variables. Two-aberration, two-parameter plotting (or double graphing, as it is sometimes called) allows the designer to reach a solution systematically while simultaneously being able to learn the effects of each parameter on each aberration.

Double Graphing

To describe this technique, a simple example is used, namely that of an axial gradient in a singlet which has two spherical surfaces. Here the two aberrations to be corrected are third-order spherical aberration and coma, and the two degrees of freedom are $C_1$, the front curvature, and $N_{01}$, the coefficient of the linear term in the expansion of the refractive index in powers of $x$. (See Equations (14)–(16).) The stop is assumed to be in contact with the first surface of the lens and the second curvature is determined to maintain a constant focal length of 10 units. The thickness is assumed to be one unit although this choice is of little consequence, as will be seen later.

The third-order spherical aberration and third-order coma are plotted as $x$ and $y$ coordinates for three values of the first curvature of the singlet. These three points may be connected by a curve of the second order, as shown in FIG. 2. From this graph, the value of curvature resulting in a certain value of either, but not both, aberrations is obtained. It is obvious that another degree of freedom is needed to correct both aberrations simultaneously to zero. The two aberrations are now plotted for three values of $N_{01}$ using a fixed value of $C_1$ resulting in a second curve which is a line parallel to the $x$ axis. This is very significant since it tells the designer that $N_{01}$ has no effect on coma. Since the two curves are not parallel, nor even nearly so, values of $C_1$ and $N_{01}$ exist such that both spherical aberration and coma are zero. (If the two curves are parallel, the effect of each parameter on the two aberrations is the same and the possible solutions are only those for either one of the parameters). From FIG. 2, the values of $N_{01}$ and $C_1$ which will result in zero spherical aberration and coma are read. With these two values and that of the second curvature, the system is analyzed. If it is adequate, the procedure is ended; if not, a new graph is constructed using values of the two parameters near the estimated solution. The technique is then repeated until a desired accuracy is reached.

The technique, while very simple, yields a great deal of information about the effect of an axial gradient in aberration correction. Table III(a) and (b) present the final results of the aplanatic singlet and list the various contributions to the total aberration coefficients. It is found that the inhomogeneous surface contribution has been most effective in the correction of the spherical aberration and, hence, has the same effect as an aspheric surface. It is also noted that the transfer contribution is small, and thus, a variation of the thickness is of little consequence in correcting the third-order aberrations.

TABLE III (a)

DESIGN PARAMETERS FOR AN APLANATIC SINGLET WITH AN AXIAL GRADIENT (STOP IN CONTACT)

| | |
|---|---|
| Object | |
|   Distance | Infinite |
|   Index | 1.000000 |
| Surface 1 | |
|   Curvature | 0.155750 |
|   Thickness | 1.000000 |
|   Optical Invariant | 0.300000 |
|   Axial Index | $1.650000 + -0.060500 \times **1$ |
|   $N(1)(Y**2)$ | $0.000000 + 0.000000 \times **1$ |
|   $N(2)(Y**4)$ | $0.000000 + 0.000000 \times **1$ |
| Surface 2 | |
|   Curvature | 0.002200 |
|   Thickness | 9.372910 |
|   Optical Invariant | 0.300000 |
|   Axial Index | $1.000000 + 0.000000 \times **1$ |
|   $N(1)(Y**2)$ | $0.000000 + 0.000000 \times **1$ |
|   $N(2) Y**4$ | $0.000000 + 0.000000 \times **1$ |
| Image | |
|   Focal Length | = 10.00 |
|   Back Focal Length | = 9.37 |
|   Tangent of Half Field Angle | = 0.30 |
|   Half Field in Degrees | = 16.70 |
|   Position of Entrance Pupil (measured to cv (1) ) | = 0.00 |
|   Image Field Radius | = 3.00 |

TABLE III (b)

SINGLET WITH AXIAL GRADIENT (STOP IN CONTACT)

THIRD ORDER ABERRATION COEFFICIENTS

| Surface | Ordinary Surface Contribution | Inhomogeneous Surface Contribution | Inhomogeneous Transfer Contribution | Total Surface Contribution |
|---|---|---|---|---|

SPHERICAL ABERRATION

| | | | | |
|---|---|---|---|---|
| 1 | −0.000451 | 0.000734 | −0.000014 | 0.000268 |
| 2 | −0.000270 | −0.000000 | 0.000000 | −0.000270 |
| Total | −0.000721 | 0.000734 | −0.000014 | −0.000001 |

COMA

| | | | | |
|---|---|---|---|---|
| 1 | −0.000869 | 0.000000 | 0.000042 | −0.000826 |
| 2 | 0.000828 | −0.000000 | 0.000000 | 0.000828 |
| Total | −0.000041 | 0.000000 | 0.000042 | 0.000001 |

ASTIGMATISM

| | | | | |
|---|---|---|---|---|
| 1 | −0.001673 | 0.000000 | −0.000126 | −0.001799 |
| 2 | −0.002540 | −0.000000 | 0.000000 | −0.002540 |
| Total | −0.004213 | −0.000000 | −0.000126 | −0.004339 |

PETZVAL CURVATURE

| | | | | |
|---|---|---|---|---|
| 1 | −0.002761 | none | 0.000000 | −0.002761 |
| 2 | 0.000037 | none | 0.000000 | 0.000037 |
| Total | −0.002724 | | 0.000000 | −0.002724 |

DISTORTION

| | | | | |
|---|---|---|---|---|
| 1 | −0.008541 | 0.000000 | 0.000372 | −0.008169 |
| 2 | 0.007683 | −0.000000 | 0.000000 | 0.007683 |
| Total | −0.000858 | −0.000000 | 0.000372 | −0.000486 |

Figure 3:
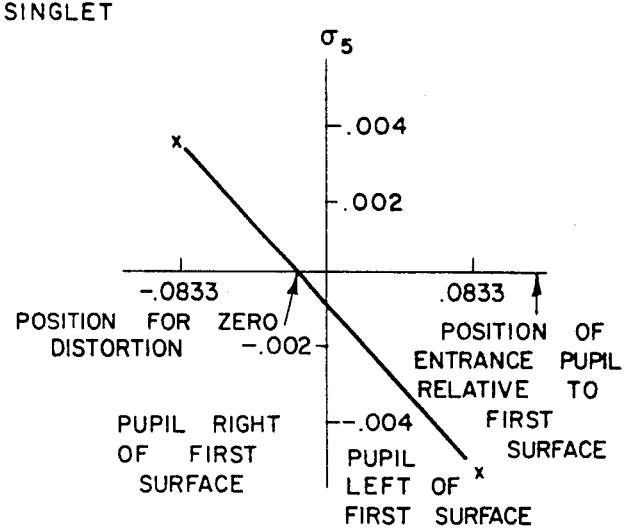
FIG. 3 is a graph depicting the shifting of a stop to eliminate distortion in an aplanatic singlet.

One more degree of freedom remains — that of stop position. It is known from first principles that a shift of the stop position effects the distortion if any other of the third-order aberrations are present. Since astigmatism and Petzval curvature are present in this singlet, a position of the stop exists such that distortion is zero. The distortion as a function of stop position is plotted in FIG. 3. The resulting lens data is found in Table IV.

Therefore, it is possible to design a singlet corrected for three of the five monochromatic aberrations with two spherical surfaces, an axial gradient, and a stop shift. This same result is achieved by using aspheric surfaces. Since gradients of this type have been produced, it is evident that it has an important use in the design of highly corrected systems.

When developing new techniques, it is always necessary to find independent checks of the work. Here a suitable check is to ray trace the system to determine its aberrations of all orders. Techniques have been published for ray tracing media having axial gradients, and the results have been programmed in a computer. The aplanatic singlet has been ray traced, and the results show that the ray aberration is a linear function of aperture meaning that only astigmatism is present and that higher orders of spherical aberration and coma are not significant.

TABLE IV (a)

DESIGN PARAMETERS FOR A SINGLET WITH AN AXIAL GRADIENT STOP PLACED FOR ZERO DISTORTION

| Object | |
|---|---|
| Distance | Infinite |
| Index | 1.000000 |
| Surface 1 | |
| Curvature | 0.155750 |
| Thickness | 1.000000 |
| Optical Invariant | 0.300000 |
| Axial Index | 1.650000 + −0.060500 × ** 1 |
| N(1)(Y**2) | 0.000000 + 0.000000 × ** 1 |
| N(2)(Y**4) | 0.000000 + 0.000000 × ** 1 |
| Surface 2 | |
| Curvature | 0.002200 |
| Thickness | 9.372910 |
| Optical Invariant | 0.299999 |
| Axial Index | 1.000000 + 0.000000 × ** 1 |
| N(1)(Y**2) | 0.000000 + 0.000000 × ** 1 |
| N(2)(Y**4) | 0.000000 + 0.000000 × ** 1 |
| Image | |
| Focal Length | = 10.00 |
| Back Focal Length | = 9.37 |
| Tangent of Half Field Angle | = 0.30 |
| Half Field in Degrees | = 16.70 |
| Position of Entrance Pupil (measured to cv (1)) | = −00.10 |
| Image Field Radius | = 3.00 |

TABLE IV (b)

SINGLET WITH AXIAL GRADIENT
STOP MOVED FOR ZERO DISTORTION
THIRD ORDER ABERRATION COEFFICIENTS

| Surface | Ordinary Surface Contribution | Inhomogeneous Surface Contribution | Inhomogeneous Transfer Contribution | Total Surface Contribution |
|---|---|---|---|---|

SPHERICAL ABERRATION

| | | | | |
|---|---|---|---|---|
| 1 | −0.000451 | 0.000734 | −0.000014 | 0.000268 |
| 2 | −0.000270 | −0.000000 | 0.000000 | −0.000270 |
| Total | −0.000721 | 0.000734 | −0.000014 | −0.000001 |

COMA

| | | | | |
|---|---|---|---|---|
| 1 | −0.000855 | −0.000023 | 0.000043 | −0.000835 |
| 2 | 0.000836 | −0.000000 | 0.000000 | 0.000836 |
| Total | −0.000019 | −0.000023 | 0.000043 | 0.000001 |

ASTIGMATISM

| | | | | |
|---|---|---|---|---|
| 1 | −0.001620 | 0.000001 | −0.000128 | −0.001748 |
| 2 | −0.002591 | −0.000000 | 0.000000 | −0.002591 |
| Total | −0.004212 | 0.000001 | −0.000128 | −0.004339 |

PETZVAL CURVATURE

| | | | | |
|---|---|---|---|---|
| 1 | −0.002761 | none | 0.000000 | −0.002761 |
| 2 | 0.000037 | none | 0.000000 | 0.000037 |
| Total | −0.002724 | | 0.000000 | −0.002724 |

DISTORTION

| | | | | |
|---|---|---|---|---|
| 1 | −0.008304 | −0.000000 | 0.000384 | −0.007920 |
| 2 | 0.007919 | −0.000000 | 0.000000 | 0.007919 |
| Total | −0.000384 | −0.000000 | 0.000384 | −0.000000 |

More important than either of these results is the fact that the aberration coefficient technique agrees with the ray trace technique.

Ramp and Exponential Index Functions

The completed aplanatic singlet has a ramp function as an index distribution which currently is not easily manufactured. It is, therefore, necessary to compare the results of this distribution with those of a lens with an exponential distribution which is produced by a diffusion process. The ramp function is described by Equations (14)–(16) as $$N(x) = N_{00} + N_{01}x \tag{88}$$

where only the linear term in x is included. In the case of an exponential distribution, the index is given by $$N(x) = N_0 + ce^{ax} \tag{89}$$

By expanding in power series, this becomes:

$$N(x) = (N_0 + c) + cax + ca^2x^2/2 + \ldots \tag{90}$$

Therefore, the two distributions are functionally the same except that the exponential form has higher order terms in $x$, and thus, the effect of the higher order terms is really being measured. These terms are not assumed to be small in this analysis, but the expansion must converge on physical grounds.

Figure 4:
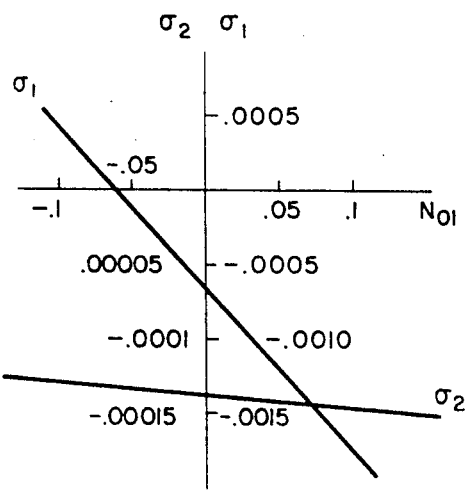
FIG. 4 is a graph depicting spherical and comatic aberrations for ramp-axial gradients.
Figure 11:
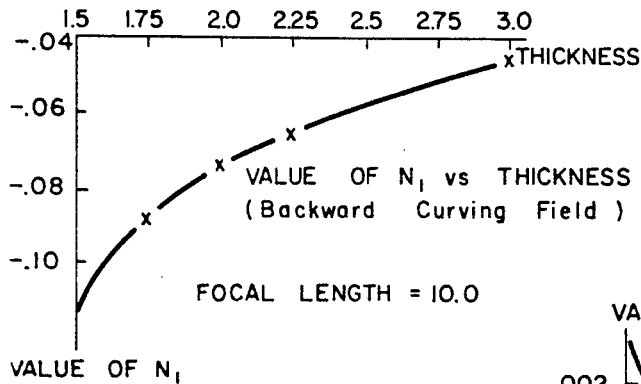
Figure 12:
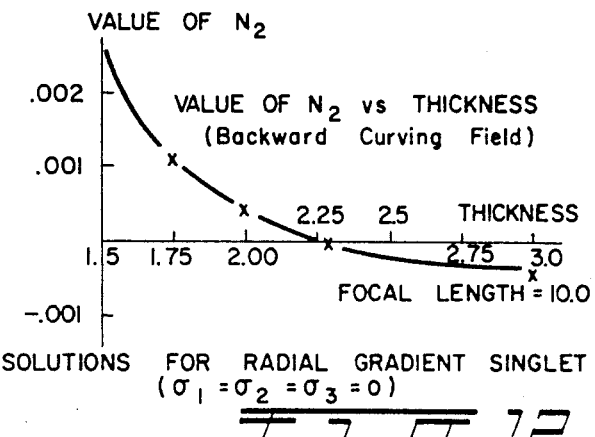
Figure 13:
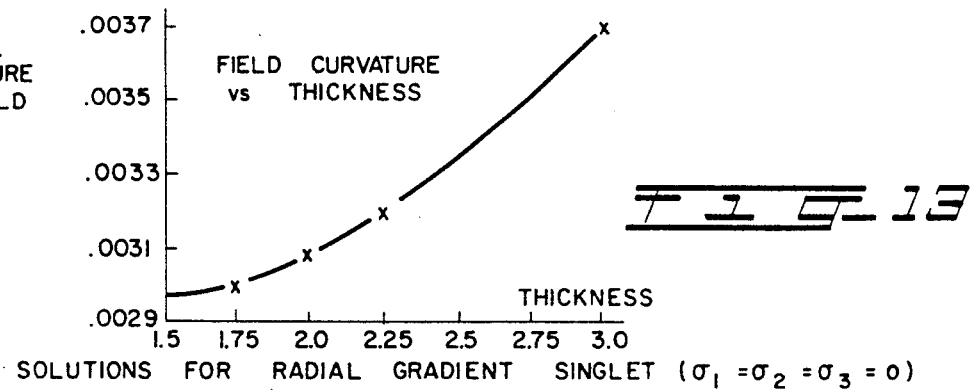
Figure 14:
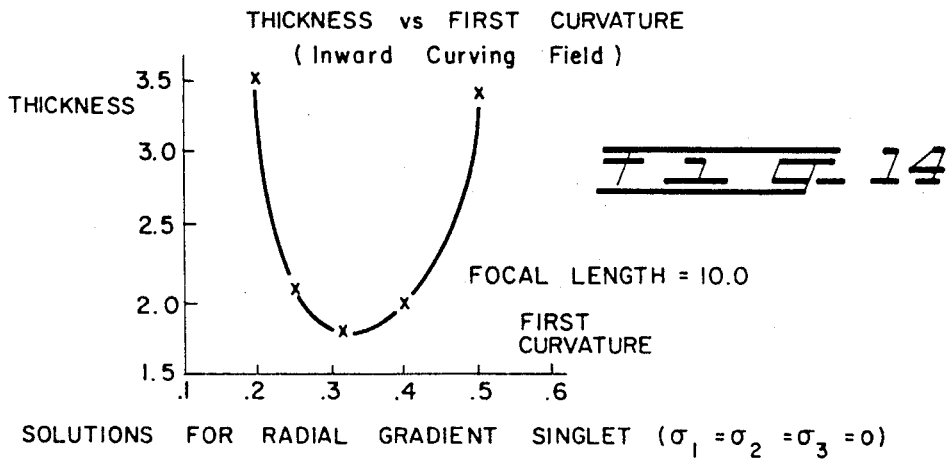
Figure 15:
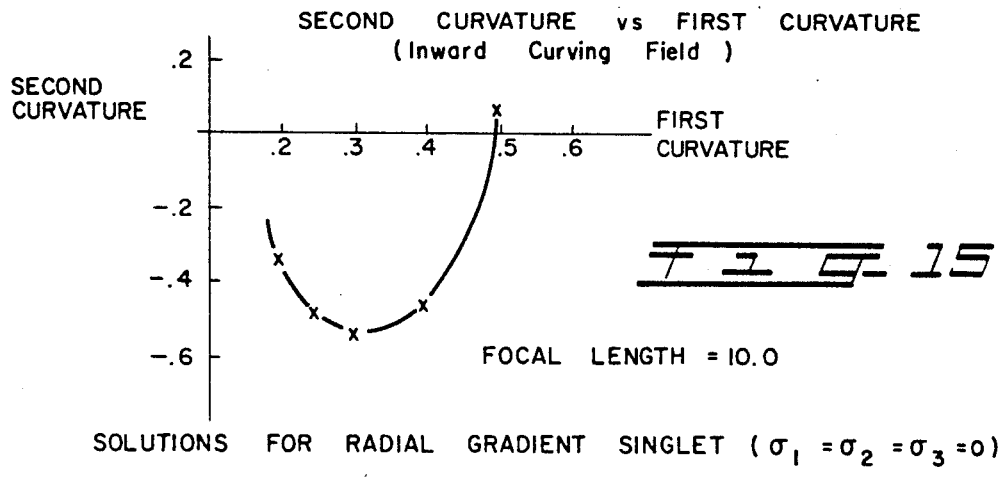
Figure 16:
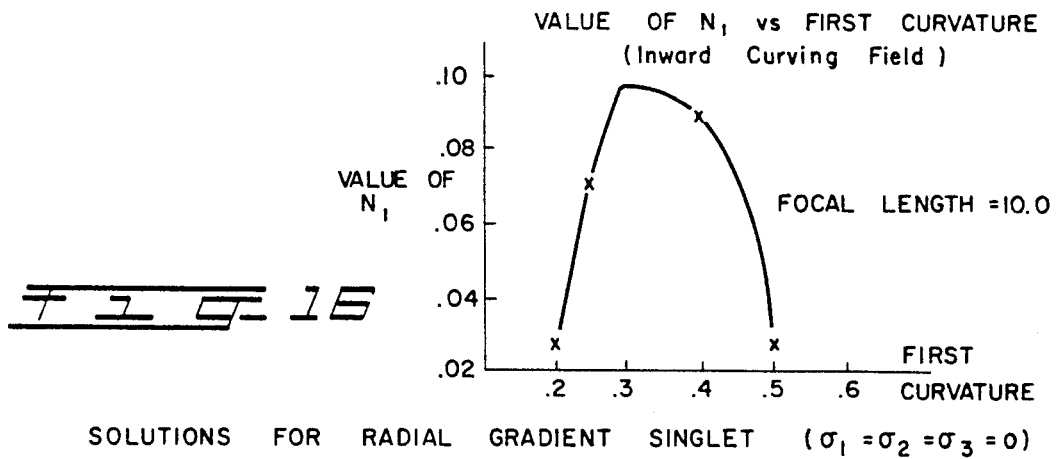
Figure 17:
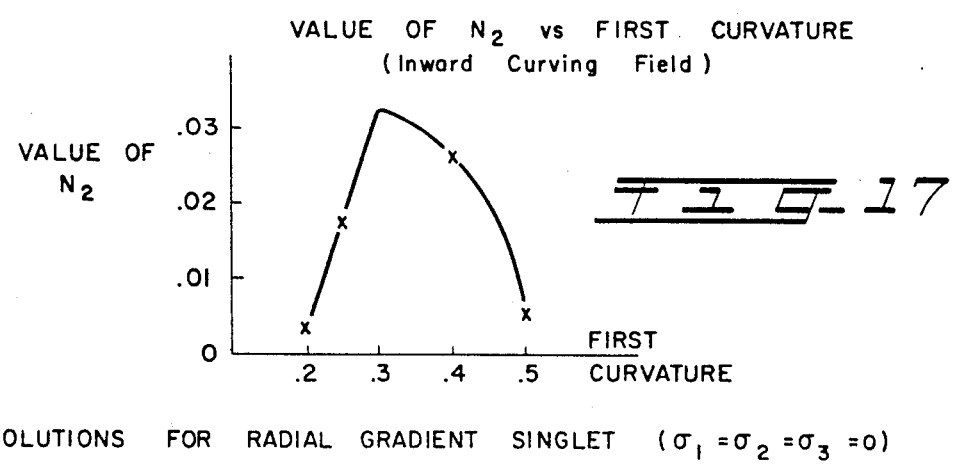

To compare them, the aberrations of the two lenses having the same curvatures and thicknesses are calculated. In FIGS. 4 and 5, the aberrations are plotted as a function of $N_{01}$ of Equation (88) while in FIG. 5, the aberrations are plotted as a function of $ac$, the coefficient of the linear term. The two graphs for each aberration are almost identical with the exponential having a greater effect on the coma and distortion as the gradient becomes larger. The fact that there is little difference in the two distributions leads to a significant result. The high order terms in an axial gradient are of little consequence and, therefore, may be ignored in the first steps of designing axial gradient optics. It also means that the design can be done with ramp functions, as is the case here, but it can be manufactured, with only a small change in the design parameters, using an exponential form of a diffusion process.

A Singlet with a Radial Gradient

Having seen that an axial refraction gradient has the same effect as an asphere, that gradient was replaced by a radial gradient of the form used for the Wood lens, that is:

$$N(Y) = N_0 + N_1 Y^2 + N_2 Y^4 \quad (91)$$

In this example, three aberrations, spherical, coma, and astigmatism, are to be corrected by suitably choosing the curvatures, thickness, and values of $N_1$ and $N_2$ while distortion is to be corrected by shifting the stop; the Petzval field curvature is uncorrected. Since in the first part of the design there are more degrees of freedom than aberrations, it might be expected that there are an infinite number of solutions. This would, of course, be the case if all the parameters affected the aberrations in different ways but, for thin lenses, this is not true. However, as the lens thickness increases their effects do indeed become independent and result in many solutions.

Since there are three aberrations to be corrected, in order to use double graphing, one of the aberrations has to be corrected separately from the others. The other two aberrations are then plotted as has been done for the aplanatic singlet. From Equations (29)–(33) it is evident that, if $N_2$ is independent of $x$, it can be taken outside the integral, and a value of $N_2$ can be found such that either $\sigma_1$, $\sigma_2$, $\sigma_3$, or $\sigma_5$ is zero. Arbitrarily, third-order spherical aberration $\sigma_1$, is corrected in this way. With this value of $N_2$, the aberrations are recalculated. There now remain three parameters, first curvature, thickness, and the value of $N_1$ while there are only two aberrations to be corrected. (The second curvature is used to maintain a given focal length, and the stop position is used later). Therefore, one is held constant, the thickness, while the other two are used as variables to correct the two aberrations, coma and astigmatism. The same technique may be used holding the curvature constant but varying thickness and $N_1$, however, finding a solution is more difficult in this case. This is due to the highly nonlinear dependence of the aberrations on thickness. An illustrative solution is given for a lens of constant thickness. (See FIG. 8). If the thickness is varied, a family of solutions is found which are characterized by backward curving fields, and large values of distortion. In FIGS. 9–13, the values of $C_1$, $C_2$, $N_1$, $N_2$ and the resulting Petzval curvature of field are plotted, as a function of thickness, for these solutions. Therefore, given a value of these which is in the range plotted, a lens design can be evaluated which is free of third-order spherical aberration, coma and astigmatism. Outside the limits of these plots, other solutions may exist, but they are characterized by large thicknesses or large values of $N_1$, which render them somewhat impracticable. Thus, according to this invention, there is not only one reasonable solution which corrects the three aberrations, but a whole family of solutions, a totally unexpected result.

While holding the curvature constant and varying the thickness and value of $N_1$, another solution will be found which is quite different from those previously found. Once one of these new solutions is determined, it is quite simple to build up the family of solutions. These singlets will be significantly different in that they have inward curving fields, smaller values of distortion, and values of $N_1$ which are opposite in sign from the first family. In FIGS. 14–18 the plots of the solutions are found which result in the correction of three aberrations. Whereas the parameters in the case of axial gradient lens are nearly linear functions of thickness, the parameters of the radial gradient lens are highly nonlinear. From FIG. 18 a plot of the Petzval curvature of field versus curvature, it appears that two solutions may exist which will also correct the curvature to zero. However, no such solution exists because the effects of the two parameters, thickness and $N_1$, are the same on the two aberrations, coma and astigmatism. Thus, the two aberrations cannot be corrected to zero but can only be minimized.

Since there is some Petzval curvature of field remaining and a reasonable value of distortion, the stop can be shifted so that the distortion is zero. (The distortion is so large in the other family of solutions that the position of the stop would have to be many focal lengths from the lens). The resulting lens for a first curvature of 0.3 is given in Table V. This lens is free of all third-order aberrations except Petzval's curvature of field. With a field angle resulting in an image field radius of 3 units (the focal length is 10 units), the image of a flat object is a sphere with a sag from center to edge of 0.6 units.

TABLE V (a)

DESIGN PARAMETERS FOR A SINGLET WITH A RADIAL GRADIENT

| | |
|---|---|
| Object | |
|   Distance | Infinite |
|   Index | 1.000000 |
| Surface 1 | |
|   Curvature | 0.300000 |
|   Thickness | 1.750000 |
|   Optical Invariant | 0.300000 |
|   Axial Index | $1.522000 + 0.000000 \times **1$ |
|   N(1)(Y**2) | $0.098300 + 0.000000 \times **1$ |
|   N(2)(Y**4) | $0.032220 + 0.000000 \times **1$ |
| Surface 2 | |
|   Curvature | −0.527223 |
|   Thickness | 10.122320 |
|   Optical Invariant | 0.299999 |
|   Axial Index | $1.000000 + 0.000000 \times **1$ |
|   N(1)(Y**2) | $0.000000 + 0.000000 \times **1$ |
|   N(2)(Y**4) | $0.000000 + 0.000000 \times **1$ |

Image
| | | |
|---|---|---|
| Focal Length | = | 10.00 |
| Back Focal Length | = | 10.12 |
| Tangent of Half Field Angle | = | 0.30 |
| Half Field in Degrees | = | 16.70 |
| Position of Entrance Pupil (measured to cv(1)) | = | −1.99 |
| Image Field Radius | = | 3.00 |

TABLE V (b)

SINGLET WITH A RADIAL GRADIENT

THIRD ORDER ABERRATION COEFFICIENTS

| Surface | Ordinary Surface Contribution | Inhomogeneous Surface Contribution | Inhomogeneous Transfer Contribution | Total Surface Contribution |
|---|---|---|---|---|
| SPHERICAL ABERRATION | | | | |
| 1 | −0.003042 | −0.058980 | 0.206827 | 0.144804 |
| 2 | −0.035989 | −0.108817 | 0.000000 | −0.144806 |
| Total | −0.039031 | −0.167797 | 0.206827 | −0.000001 |
| COMA | | | | |
| 1 | −0.001225 | 0.035229 | −0.084663 | −0.050659 |
| 2 | 0.025240 | 0.025421 | 0.000000 | 0.050661 |
| Total | 2.024015 | 0.060650 | −0.084663 | 0.000001 |
| ASTIGMATISM | | | | |
| 1 | −0.000493 | −0.021042 | 0.045173 | 0.023637 |
| 2 | −0.017701 | −0.005939 | 0.000000 | −0.023640 |
| Total | −0.018195 | −0.026981 | 0.045173 | −0.000003 |
| PETZVAL CURVATURE | | | | |
| 1 | −0.004630 | none | 0.006684 | 0.002053 |
| 2 | −0.008137 | none | 0.000000 | −0.008137 |
| Total | −0.012767 | | 0.006684 | −0.006084 |
| DISTORTION | | | | |
| 1 | −0.002063 | 0.012568 | −0.030014 | −0.019509 |
| 2 | 0.018121 | 0.001387 | 0.000000 | 0.019508 |
| Total | 0.016058 | 0.013956 | −0.030014 | −0.000001 |

These two families of solutions exhibit the full potential of gradient index optics in lens design, according to the invention.

Summary

Throughout the exploration of inhomogeneous glasses, checks have been sought to validate the results of the study. The Wood lens provided the first, when the value of $N_2$ was determined from the condition for a perfect axial image and then checked by calculating the value of $N_2$ required to correct third-order spherical aberration. The value was found in two somewhat different ways. First power series were assumed for the height and direction of the two rays and the aberrations calculated. Then the aberrations were determined for the radial gradient case by reworking the integrals. The values of $N_2$ required to correct third-order spherical aberration agreed with those calculated from the Wood lens analysis.

The second verification was the calculation of the aberrations by ray tracing the third-order theory for the aplanatic singlet with an axial gradient. Since the two methods were entirely unrelated, the agreement of the results was very significant. Thus, two independent techniques have been used to verify the work set forth herein and in each case, the calculation of the third-order aberration coefficients has been confirmed.

Having made this study, it is of some interest to restate the usefulness of each of the gradients and their effectiveness. It was seen that the axial gradient independent of whether it was a ramp function or an exponential, had the same effect as the addition of an aspheric surface to a singlet. Now that glasses can be economically manufactured with axial gradients, there exists an alternative to the problem of the production of aspheres. Because of its use in correcting aberrations, perhaps a more important gradient is the radial gradient. The design of highly-corrected, few element systems, is possible with this cylindrical distribution.

This invention has confirmed the great potential of continuously varying indices of refraction in designing highly corrected systems. It has become clear that the development of procedures for making radial gradients in large optics would be a significant addition for such applications as corrector plates. The use of these gradients could virtually eliminate the need for manufacturing aspheres. High-quality, low-cost gradient index optics should now be the goal of the designer and manufacturers of lenses during this decade.

The design parameters for some specific illustrative examples are given below. One skilled in the art will appreciate that these specific examples are not limiting and that by well known techniques, such as scaling and extrapolation, other specific designs could be derived which would, nevertheless, fall within the spirit and scope of this invention. The symbols used for the lens parameters below, and throughout the specification, are believed to be standard. FIG. 19 gives an example of the application of these symbols to an actual optical system.

It must again be stressed that radial and axial gradients that are defined by other mathematical equations (e.g., exponential, sinusoidal, etc.) are encompassed by this invention, as a simple *power* series expansion, followed by a grouping of like terms, will result in an equation of the form assumed herein.

Specific Examples

Example 1

$N_{00} = 1.65$    Focal Length = 10.0    Infinite Conjugates

| t | $N_{01}$ | $CV_1$ | $CV_2$ | $D_r$ |
|---|---|---|---|---|
| 0.10 | −0.060655 | +0.157835 | +0.004036 | +0.015429 |
| 0.25 | −0.060635 | +0.157501 | +0.003786 | +0.039080 |
| 0.50 | −0.060608 | +0.156937 | +0.003330 | +0.079900 |
| 1.00 | −0.060580 | +0.155772 | +0.002247 | +0.167158 |
| 1.50 | −0.060595 | +0.154551 | +0.000885 | +0.262651 |

Example 2

$N_{00} = 1.65$    Thickness = 1.0    Infinite Conjugates

| F.L. | $N_{01}$ | $CV_1$ | $CV_2$ | $D_r$ |
|---|---|---|---|---|
| −20 | +0.030849 | −0.079485 | −0.002386 | +0.146020 |
| −10 | +0.060822 | −0.160173 | −0.005461 | +0.140520 |
| −05 | +0.122204 | −0.324328 | −0.012478 | +0.129779 |
| 5 | −0.121316 | +0.306526 | −0.001662 | +0.183669 |
| 10 | −0.060580 | +0.155772 | +0.002247 | +0.167158 |
| 13.3 | −0.045447 | +0.117271 | +0.002110 | +0.163439 |
| 15.0 | −0.040403 | +0.104369 | +0.001991 | +0.162280 |
| 20.0 | −0.030314 | +0.078468 | +0.001656 | +0.159820 |

Example 3

Thickness = 1.0    Focal Length = 10.0    Infinite Conjugates

| $N_{00}$ | $N_{01}$ | $CV_1$ | $CV_2$ | $D_r$ |
|---|---|---|---|---|
| 1.50 | −0.069525 | +0.176928 | −0.029158 | +0.256973 |
| 1.65 | −0.060580 | +0.155772 | +0.002247 | +0.167158 |
| 1.70 | −0.058830 | +0.150876 | +0.009328 | +0.136956 |
| 1.80 | −0.056227 | +0.142977 | +0.020656 | +0.075885 |

Example 4

$N_{00} = 1.65$    Focal Length = 10.0    Thickness = 1.0

| Conjugates | $N_{01}$ | $CV_1$ | $CV_2$ | $D_r$ |
|---|---|---|---|---|
| ∞ | −0.060580 | +0.155772 | +0.002247 | +0.167158 |
| 20:1 | −0.068290 | +0.148095 | −0.006926 | +0.201966 |
| 10:1 | −0.077089 | +0.141083 | −0.015431 | +0.233494 |

|   |   |   |   |   |
|---|---|---|---|---|
| 5:1 | −0.099553 | +0.128723 | −0.031091 | +0.288665 |
| 2:1 | −0.216947 | +0.108385 | −0.069923 | +0.380051 |
| 1:1 |   |   |   |   |

Example 5

$N_{00} = 1.65$, F.L. = 10.0, Thickness = 1.0, Infinite Conjugates

| P* | $N_{01}$ | $CV_1$ | $CV_2$ | $D_s$ |
|---|---|---|---|---|
| 0.5 | +0.060708 | −0.160172 | −0.005703 | +0.139722 |
| 0.2 | +0.060715 | −0.160132 | −0.005821 | +0.139721 |
| 0.1 | +0.060719 | −0.160115 | −0.005858 | +0.03469 |
| 0.05 | +0.060721 | −0.160106 | −0.005875 | +0.089514 |
| 0.01 | +0.060723 | −0.160098 | −0.005890 | +0.129413 |

Example 6

$N_{00} = 1.65$, Focal Length = 10.0, Infinite Conjugates

| t | $N_{01}$ | $CV_1$ | $CV_2$ |
|---|---|---|---|
| 0.10 | −0.060655 | +0.157835 | +0.004036 |
| 0.25 | −0.060635 | +0.157501 | +0.003786 |
| 0.50 | −0.060608 | +0.156937 | +0.003330 |
| 1.00 | −0.060580 | +0.155772 | +0.002247 |
| 1.50 | −0.060595 | +0.154551 | +0.000885 |

*In Example 5, above, P is the distance, in units from the first surface of the lens to the boundary plane of the index gradient.

Example 7

$N_{00} = 1.65$, Thickness = 1.0, Infinite Conjugates

| F.L. | $N_{01}$ | $CV_1$ | $CV_2$ |
|---|---|---|---|
| −20 | +0.030849 | −0.079485 | −0.002386 |
| −10 | +0.060822 | −0.160173 | −0.005461 |
| −05 | +0.122204 | −0.324328 | −0.012478 |
| +05 | −0.121316 | +0.306526 | −0.001662 |
| +10 | −0.060580 | +0.155772 | +0.002247 |
| +13.3 | −0.045447 | +0.117271 | +0.002110 |
| +15.0 | −0.040403 | +0.104369 | +0.001991 |
| +20.0 | −0.030314 | +0.078468 | +0.001656 |

Example 8

Thickness = 1.0, Focal Length = 10.0, Infinite Conjugates

| $N_{00}$ | $N_{01}$ | $CV_1$ | $CV_2$ |
|---|---|---|---|
| +1.50 | −0.069525 | +0.176928 | −0.029158 |
| +1.65 | −0.060580 | +0.155772 | +0.002247 |
| +1.70 | −0.058830 | +0.150876 | +0.009328 |
| +1.80 | −0.056227 | +0.142977 | +0.020656 |

Example 9

$N_{00} = 1.65$, Focal Length = 10.0, Thickness = 1.0

| Conjugates | $N_{01}$ | $CV_1$ | $CV_2$ |
|---|---|---|---|
| ∞ | −0.060580 | +0.155772 | +0.002247 |
| 20:1 | −0.068290 | +0.148095 | −0.006926 |
| 10:1 | −0.077089 | +0.141083 | −0.15431 |
| 5:1 | −0.099553 | +0.128723 | −0.031091 |
| 2:1 | −0.216947 | +0.108385 | −0.069923 |
| 1:1 |   |   |   |

Example 10

$N_{00} = 1.65$, F.L. = 10.0, Thickness = 1.0, Infinite Conjugates

| P | $N_{01}$ | $CV_1$ | $CV_2$ |
|---|---|---|---|
| +0.5 | +0.060708 | −0.160172 | −0.005703 |
| +0.2 | +0.060715 | −0.160132 | −0.005821 |
| +0.1 | +0.060719 | −0.160115 | −0.005858 |
| +0.05 | +0.060721 | −0.160106 | −0.005875 |
| +0.01 | +0.060723 | −0.160098 | −0.005890 |

Example 11

Thickness = 1.75, Focal Length = 10.0, Infinite Conjugates

| $N_{00}$ | $N_{10}$ | $N_{20}$ | $CV_1$ | $CV_2$ | $D_s$ |
|---|---|---|---|---|---|
| 1.4 | +0.06689 | +0.023177 | +0.255839 | −0.561284 | +1.050289 |
| 1.522 | +0.098271 | +0.32214 | +0.299565 | −0.527441 |   |
| 1.6 | +0.126280 | +0.042136 | +0.374174 | −0.50294 | +0.203626 |

Example 12

Thickness = 1.75, $N_{00} = 1.60$, Infinite Conjugates

| F.L. | $N_{10}$ | $N_{20}$ | $CV_1$ | $CV_2$ | $D_s$ |
|---|---|---|---|---|---|
| 20 | +0.108187 | +0.026284 | +0.307478 | −0.386190 | +0.167624 |
| 15 | +0.114673 | +0.031391 | +0.321045 | −0.435438 |   |
| 10 | +0.126280 | +0.042136 | +0.374174 | −0.502954 | +0.203626 |
| 5 | +0.131524 | +0.062811 | +0.442996 | −0.641479 | +1.9924 |

Example 13

Thickness = 1.75, Focal Length = 10, $N_{00} = 1.60$

| Conjugates | $N_{10}$ | $N_{20}$ | $CV_1$ | $CV_2$ | $D_s$ |
|---|---|---|---|---|---|
| ∞ | 0.126280 | 0.042136 | 0.374174 | −0.502954 | 0.203626 |
| 20:1 | 0.120395 | 0.039118 | 0.327927 | −0.513103 | 0.522978 |
| 10:1 | 0.117710 | 0.037884 | 0.304176 | −0.519038 | 0.702876 |
| 5:1 | 0.114577 | 0.036563 | 0.273485 | −0.527172 | 0.955217 |
| 2:1 | 0.110197 | 0.035040 | 0.221524 | −0.542673 | 1.461615 |
| 1:1 | 0.107477 | 0.034451 | 0.178295 | −0.557495 |   |

Example 14

Focal Length = 10, Infinite Conjugates, $N_{00} = 1.60$

| Thickness | $N_{10}$ | $N_{20}$ | $CV_1$ | $CV_2$ | $D_s$ |
|---|---|---|---|---|---|
| 3.0 | 0.045232 | 0.006746 | 0.252046 | −0.354604 | 3.423346 |
| 2.5 | 0.061631 | 0.011826 | 0.252132 | −0.409335 | 3.890436 |
| 2.0 | 0.090124 | 0.023948 | 0.251569 | −0.488262 | 2.380245 |
| 1.75 | 0.126280 | 0.042136 | 0.374174 | −0.502954 | 0.203626 |

Example 15

Thickness = 1.75, Focal Length = 10.0, Infinite Conjugates

| $N_{00}$ | $N_{10}$ | $N_{20}$ | $CV_1$ | $CV_2$ |
|---|---|---|---|---|
| 1.4 | +0.06689 | +0.023177 | +0.255839 | −0.561284 |
| 1.522 | +0.098271 | +0.32214 | +0.299565 | −0.527441 |
| 1.6 | +0.126280 | +0.042136 | +0.374174 | −0.50294 |

Example 16

Thickness = 1.75, Focal Length = 10.0, Infinite Conjugates

| $N_{00}$ | $N_{10}$ | $N_{20}$ | $CV_1$ | $CV_2$ |
|---|---|---|---|---|
| 1.4 | −0.084520 | +0.002668 | +0.209143 | +0.853189 |
| 1.5 | −0.088781 | +0.001322 | +0.237134 | +0.835703 |
| 1.6 | −0.092238 | +0.000117 | +0.260641 | +0.833375 |

Example 17

Thickness = 1.75, $N_{00} = 1.60$, Infinite Conjugates

| F.L. | $N_{10}$ | $N_{20}$ | $CV_1$ | $CV_2$ |
|---|---|---|---|---|
| 20 | +0.108187 | +0.026284 | +0.307478 | −0.386190 |
| 15 | +0.114673 | +0.031391 | +0.321045 | −0.435438 |
| 10 | +0.126280 | +0.042136 | +0.374174 | −0.502954 |
| 5 | +0.131524 | +0.062811 | +0.442996 | −0.641479 |

Example 18

Thickness = 1.75, $N_{00} = 1.60$, Infinite Conjugates

| F.L. | $N_{10}$ | $N_{20}$ | $CV_1$ | $CV_2$ |
|---|---|---|---|---|
| +20 | −0.053598 | +0.000826 | +0.184690 | +0.492021 |
| +15 | −0.067289 | +0.000839 | +0.211435 | +0.606620 |
| +10 | −0.092238 | +0.000117 | +0.260641 | +0.833375 |
| +05 | −0.158702 | −0.008915 | +0.396015 | +1.642075 |

Example 19

Thickness = 1.75, Focal Length = 10, $N_{00} = 1.60$

| Conjugates | $N_{10}$ | $N_{20}$ | $CV_1$ | $CV_2$ |
|---|---|---|---|---|
| ∞ | 0.126280 | +0.042136 | +0.374174 | −0.502954 |
| 20:1 | 0.120395 | +0.039118 | +0.327927 | −0.513103 |
| 10:1 | 0.117710 | +0.037884 | +0.304176 | −0.519038 |
| 5:1 | 0.114577 | +0.036563 | +0.273485 | −0.527172 |
| 2:1 | 0.110197 | +0.035040 | +0.221524 | −0.542673 |
| 1:1 | 0.107477 | +0.034451 | +0.178295 | −0.557495 |

Example 20

Thickness = 1.75, Focal Length = 10, $N_{00} = 1.60$

| Conjugates | $N_{10}$ | $N_{20}$ | $CV_1$ | $CV_2$ |
|---|---|---|---|---|
| ∞ | −0.992238 | 0.000117 | +0.260641 | +0.833375 |
| 20:1 | −0.092900 | 0.000548 | +0.250957 | +0.816016 |
| 10:1 | −0.093489 | 0.000935 | +0.242169 | +0.800673 |
| 5:1 | −0.094462 | 0.001604 | +0.226825 | +0.774626 |
| 2:1 | −0.096571 | 0.003021 | +0.193687 | +0.722555 |
| 1:1 | −0.098693 | 0.004366 | +0.161507 | +0.677219 |

Example 21

Focal Length = 10, Infinite Conjugates, $N_{00} = 1.60$

| Thickness | $N_{10}$ | $N_{20}$ | $CV_1$ | $CV_2$ |
|---|---|---|---|---|
| 3.0 | +0.045232 | +0.006746 | +0.252046 | −0.354604 |
| 2.5 | +0.061631 | +0.011826 | +0.252132 | −0.409335 |
| 2.0 | +0.090124 | +0.023948 | +0.251569 | −0.488262 |
| 1.75 | +0.126280 | +0.042136 | +0.374174 | −0.502954 |

Example 22

Focal Length = 10, Infinite Conjugates, $N_{00} = 1.60$

| Thickness | $N_{10}$ | $N_{20}$ | $CV_1$ | $CV_2$ |
|---|---|---|---|---|
| 3.0 | −0.047735 | −0.000605 | +0.209069 | +0.803016 |
| 2.5 | −0.059577 | −0.000586 | +0.224043 | +0.800711 |
| 2.0 | −0.078299 | −0.000308 | +0.245681 | +0.816579 |
| 1.75 | −0.092238 | +0.000117 | +0.260641 | +0.833875 |
| 1.50 | −0.111418 | +0.001031 | +0.280029 | +0.858299 |
| 1.00 | −0.182527 | +0.008065 | +0.343729 | +0.947781 |

What is claimed is:

1. A singlet lens having an axial index of refraction gradient according to an equation of the form $$N(x) = N_{00} + N_{01}x + N_{02}x^2 + \ldots$$

where $N_{00}$, $N_{01}$, and $N_{02}$ are the coefficients of the first, second and third terms, respectively, of a power series expansion of $N(x)$, the index of refraction of the lens as a function of $x$, the distance along the optical axis of the lens measured from the vertex of the first surface, said lens having a thickness $t$, a first curvature $CV_1$, a second curvature $CV_2$, and a focal length F.L., said lens further having at least the third-order spherical aberration and coma thereof simultaneously reduced, the reduction in spherical aberration and coma being effected by selective adjustments to $N_{01}$, the coefficient of the second term of the index of refraction equation, and to $CV_1$, respectively, and the focal length F.L. being determined by $CV_2$.

2. An optical system comprising, in combination, a singlet lens and a stop, said lens having an axial index of refraction gradient according to an equation of the form $$N(x) = N_{00} + N_{01}x + N_{02}x^2 + \ldots,$$

where $N_{00}$, $N_{01}$ and $N_{02}$ are the coefficients of the first, second and third terms, respectively, of a power series expansion of $N(x)$, the index of refraction of the lens as a function of $x$, the distance along the optical axis of the lens measured from the vertex of the first surface, said lens having a thickness $t$, a first curvature $CV_1$, a second curvature $CV_2$, and a focal length F.L. and the lens to stop distance being $D_s$, said system having at least the third-order spherical aberration, coma and distortion thereof simultaneously reduced, the reduction in spherical aberration, coma and distortion being effected by selective adjustments to $N_{01}$ the coefficient of the second term of said index of refraction equation, $CV_1$ and $D_s$, respectively, and the focal length F.L. being determined by $CV_2$.

3. A singlet lens having a radial index of refraction gradient according to an equation of the form $$N(\rho) = N_{00} + N_{10}\rho^2 + N_{20}\rho^4 + \ldots,$$

where, $\rho^2 = y^2 + z^2$, and $N_{00}$, $N_{10}$, and $N_{20}$ are the coefficients of the first, second and third terms, respectively, of a power series expansion of $N(\rho)$, the index of refraction of the lens as a function of $\rho$, $\rho^2 = y^2 + z^2$, where $y$ and $z$ represent distances measured along the two orthogonal coordinates of the lens, said orthogonal axes intercepting the optical axis of the lens, said lens having a thickness $t$, a first curvature $CV_1$, a second curvature $CV_2$, and a focal length F.L., said lens further having at least the third-order spherical aberration, coma and astigmatism thereof simultaneously reduced, the reduction in spherical aberration and coma and astigmatism being effected by selective adjustments to: $N_{20}$, the coefficient of the third term of the index of refraction equation; and $t$, $CV_1$ and $N_{10}$, the coefficient of the second term in the index of refraction equation, respectively, and the focal length F.L. being determined by $CV_2$.

4. An optical system comprising, in combination, a singlet lens and a stop, said lens having a radial index of refraction gradient according to an equation of the form $$N(\rho) = N_{00} + N_{10}\rho^2 + N_{20}\rho^4 + \ldots,$$

where, $\rho^2 = y^2 + z^2$, and $N_{00}$, $N_{10}$, and $N_{20}$ are the coefficients of the first, second and third terms, respectively, of a power series expansion of $N(\rho)$, the index of refraction of the lens as a function of $\rho$, $\rho^2 = y^2 + z^2$, where $y$ and $z$ represent distances measured along the two orthogonal coordinates of the lens, said orthogonal axes intercepting the optical axis of the lens, said lens having a thickness $t$, a first curvature $CV_1$, a second curvature $CV_2$, and a focal length F.L., and the lens to stop distance being $D_s$, said lens having at least the third-order spherical aberration, coma, astigmatism and distortion thereof simultaneously reduced, the reduction in spherical aberration, distortion, and coma and astigmatism, being effected by selective adjustments to: $N_{20}$, the coefficient of the third term in said index of refraction equation; $D_s$; and, $CV_1$,$t$, and $N_{10}$, the coefficient of the second term of said index of refraction equation, respectively, and the focal length F.L. being determined by $CV_2$.

5. A singlet lens having plane, parallel surfaces and a radial index of refraction gradient according to an equation of the form $$N(\rho) = N_{00} + N_{10}\rho^2 + N_{20}\rho^4 + \ldots,$$

where, $\rho^2 = y^2 + z^2$, and $N_{00}$, $N_{10}$, and $N_{20}$ are the coefficients of the first, second and third terms, respectively, of a power series expansion of $N(\rho)$, the index of refraction of the lens as a function of $\rho$, $\rho^2 = y^2 + z^2$, where $y$ and $z$ represent distances measured along the two orthogonal coordinates of the lens, said orthogonal axes intercepting the optical axis of the lens, said lens having a thickness t and and a focal length F.L., said lens further having at least the third-order spherical aberration thereof reduced, said focal length being established by selective variation of $N_{10}$, the coefficient of the second term of said index of refraction equation, and said reduction in spherical aberration being effected by selective variation of $N_{20}$, the coefficient of the third term of said index of refraction equation, the product of thickness $t$ and $N_{10}$ being substantially constant for any given focal length F.L.

6. An optical system comprising, in combination, a singlet lens and a stop, said lens having an axial index of refraction gradient according to an equation of the form $$N(x) = N_{00} + N_{01}x \ldots,$$

said lens further having a thickness t, a first curvature $CV_1$ and a second curvature $CV_2$, wherein for a starting value of the index of refraction $N_{00} = 1.65$, a focal length F.L. = 10.0 units, and infinite conjugates, the relationship between $CV_1$, $CV_2$, the stop to lens distance $D_s$, and $N_{01}$, the coefficient of the second term of the index of refraction equation, as a function of thickness t, is substantially given by the following table, and interpolations and extrapolations thereof, whereby at least the third-order spherical aberration, coma, and distortion of said system are simultaneously reduced

| $N_{00} = 1.65$ | Focal Length = 10.0 | | Infinite Conjugates | |
|---|---|---|---|---|
| t | $N_{01}$ | $CV_1$ | $CV_2$ | $D_s$ |
| 0.10 | −0.060655 | +0.157835 | +0.004036 | +0.015429 |
| 0.25 | −0.060635 | +0.157501 | +0.003786 | +0.039080 |
| 0.50 | −0.060608 | +0.156937 | +0.003330 | +0.079900 |
| 1.00 | −0.060580 | +0.155772 | +0.002247 | +0.167158 |
| 1.50 | −0.060595 | +0.154551 | +0.000885 | +0.262651 |

7. An optical system comprising, in combination, a singlet lens and a stop, said lens having an axial index of refraction gradient according to an equation of the form $$N(x) = N_{00} + N_{01}x \ldots$$

said lens further having a thickness t, a first curvature $CV_1$, and a second curvature $CV_2$, wherein for a starting value of the index of refraction $N_{00} = 1.65$, a lens thickness $t = 1.0$ units, and infinite conjugates, the relationship between $CV_1$, $CV_2$, the stop to lens distance $D_s$, and $N_{01}$, the coefficient of the second term in the index of refraction equation, as a function of the focal length, F.L., is substantially given by the following table, and interpolations and extrapolations thereof, whereby at least the third-order spherical aberration, coma, and distortion of said system are simultaneously reduced

| $N_{00} = 1.65$ F.L. | Thickness = 1.0 $N_{01}$ | $CV_1$ | Infinite Conjugates $CV_2$ | $D_s$ |
|---|---|---|---|---|
| −20 | +0.030849 | −0.079485 | −0.002386 | +0.146020 |
| −10 | +0.060822 | −0.160173 | −0.005461 | +0.140520 |
| −.05 | +0.122204 | −0.324328 | −0.012478 | +0.129779 |
| 5 | −0.121316 | +0.306526 | −0.001662 | +0.183669 |
| 10 | −0.060580 | +0.155772 | +0.002247 | +0.167158 |
| 13.3 | −0.045447 | +0.117271 | +0.002110 | +0.163439 |
| 15.0 | −0.040403 | +0.104369 | +0.001991 | +0.162280 |
| 20.0 | −0.030314 | +0.078468 | +0.001656 | +0.159820 |

8. An optical system comprising, in combination, a singlet lens and a stop, said lens having an axial index of refraction gradient according to an equation of the form $$N(x) = N_{00} + N_{01}x \ldots$$

said lens further having a thickness $t$, a first curvature $CV_1$, and a second curvature $CV_2$, wherein for a lens thickness $t = 1.0$ units, a focal length, F.L. = 10.0 units, and infinite conjugates, the relationship between $CV_1$, $CV_2$, the stop to lens distance $D_s$, and $N_{01}$, the coefficient of the second term of the index of refraction equation, as a function of $N_{00}$, the starting value of the index of refraction, is substantially given by the following table, and interpolations and extrapolations thereof, whereby at least the third-order spherical aberration, coma, and distortion of said system are simultaneously reduced

| Thickness = 1.0 $N_{00}$ | Focal Length = 10.0 $N_{01}$ | $CV_1$ | Infinite Conjugates $CV_2$ | $D_s$ |
|---|---|---|---|---|
| 1.50 | −0.069525 | +0.176928 | −0.029158 | +0.256973 |
| 1.65 | −0.060580 | +0.155772 | +0.002247 | +0.167158 |
| 1.70 | −0.058830 | +0.150876 | +0.009328 | +0.136956 |
| 1.80 | −0.056227 | +0.142977 | +0.020656 | +0.075885 |

9. An optical system comprising, in combination, a singlet lens and a stop, said lens having an axial index of refraction gradient according to an equation of the form $$N(x) = N_{00} + N_{01}x \ldots$$

said lens further having a thickness $t$, a first curvature $CV_1$, and a second curvature $CV_2$, wherein for a focal length F.L. = 10.0 units, a thickness $t = 1.0$ units, and a starting value of the index of refraction $N_{00} = 1.65$, the relationship between $CV_1$, $CV_2$, the stop to lens distance $D_s$, and $N_{01}$, the coefficient of the second term of the index of refraction equation, as a function of the object-image conjugates, is substantially given by the following table, and interpolations and extrapolations thereof, whereby at least the third-order spherical aberration, coma, and distortion of said system are simultaneously reduced

| $N_{00} = 1.65$ Conjugates | Focal Length = 10.0 $N_{01}$ | $CV_1$ | Thickness = 1.0 $CV_2$ | $D_s$ |
|---|---|---|---|---|
| ∞ | −0.060580 | +0.155772 | +0.002247 | +0.167158 |
| 20:1 | −0.068290 | +0.148095 | −0.006926 | +0.201966 |
| 10:1 | −0.077089 | +0.141083 | −0.015431 | +0.233494 |
| 5:1 | −0.099553 | +0.128723 | −0.031091 | +0.288665 |
| 2:1 | −0.216947 | +0.108385 | −0.069923 | +0.380051 |
| 1:1 | | | | |

10. An optical system comprising, in combination, a singlet lens and a stop, said lens having a zone therein having an axial index of refraction gradient according to an equation of the form $$N(x) = N_{00} + N_{01}x \ldots$$

said zone being bounded by a plane which is parallel to the $x$–$z$ plane of the system, said lens further having a thickness t, a first curvature $CV_1$, and a second curvature, $CV_2$, wherein for a starting value of the index of refraction $N_{00} = 1.65$, a lens thickness of $t = 1.0$ units, a focal length of F.L. = 10.0 units, and infinite conjugates, the relationship between $CV_1$, $CV_2$, the lens to stop distance $D_s$, and $N_{01}$, the coefficient of the second term in the index of refraction equation, as a function of P, the position, in units, of the zone boundary plane from the front surface of the lens, is substantially given by the following table, and interpolations and extrapolations thereof, whereby at least the third-order spherical aberration, coma, and distortion of said system are simultaneously reduced

| $N_{00} = 1.65$ P | F.L. = 10.0 $N_{01}$ | $CV_1$ | Thickness = 1.0 $CV_2$ | Infinite Conjugates $D_s$ |
|---|---|---|---|---|
| 0.5 | +0.060708 | −0.160172 | −0.005703 | +0.139722 |
| 0.2 | +0.060715 | −0.160132 | −0.005821 | +0.139721 |
| 0.1 | +0.060719 | −0.160115 | −0.005858 | +0.03469 |
| 0.05 | +0.060721 | −0.160106 | −0.005875 | +0.089514 |
| 0.01 | +0.060723 | −0.160098 | −0.005890 | +0.129413 |

11. A singlet lens, said lens having an axial index of refraction gradient according to an equation of the form $$N(x) = N_{00} + N_{01}x \ldots$$

said lens further having a thickness t, a first curvature $CV_1$ and a second curvature $CV_2$, wherein for a starting value of the index of refraction $N_{00} = 1.65$, a focal length, F.L. = 10.0 units, and infinite conjugates, the relationship between $CV_1$, $CV_2$, and $N_{01}$, the coefficient of the second term of the index of refraction equation, as a function of the thickness t, is substantially given by the following table, and interpolations and extrapolations thereof, whereby at least the third-order spherical aberration and coma of said lens are simultaneously reduced

| $N_{00} = 1.65$ t | Focal Length = 10.0 $N_{01}$ | $CV_1$ | Infinite Conjugates $CV_2$ |
|---|---|---|---|
| 0.10 | −0.060655 | +0.157835 | +0.004036 |
| 0.25 | −0.060635 | +0.157501 | +0.003786 |
| 0.50 | −0.060608 | +0.156937 | +0.003330 |
| 1.00 | −0.060580 | +0.155772 | +0.002247 |
| 1.50 | −0.060595 | +0.154551 | +0.000885 |

12. A singlet lens, said lens having an axial index of refraction gradient according to an equation of the form $$N(x) = N_{00} + N_{01}x \ldots$$

said lens further having a thickness t, a first curvature $CV_1$, and a second curvature $CV_2$, wherein for a starting value of the index of refraction $N_{00} = 1.65$, a lens thickness $t = 1.0$ units, and infinite conjugates, the relationship between $CV_1$, $CV_2$, and $N_{01}$, the coefficient of the second term in the index of refraction equation, as a function of the focal length, F.L., is substantially given by the following table, and interpolations and extrapolations thereof, whereby at least the third-order spherical aberration and coma of said lens are simultaneously reduced

| N = 1.65 | Thickness = 1.0 | | Infinite Conjugates |
|---|---|---|---|
| F.L. | $N_{01}$ | $CV_1$ | $CV_2$ |
| −20 | +0.030849 | −0.079485 | −0.002386 |
| −10 | +0.060822 | −0.160173 | −0.005461 |
| −05 | +0.122204 | −0.324328 | −0.012478 |
| +05 | −0.121316 | +0.306526 | −0.001662 |
| +10 | −0.060580 | +0.155772 | +0.002247 |
| +13.3 | −0.045447 | +0.117271 | +0.002110 |
| +15.0 | −0.040403 | +0.104369 | +0.001991 |
| +20.0 | −0.030314 | +0.078468 | +0.001656 |

13. A singlet lens, said lens having an axial index of refraction gradient according to an equation of the form $$N(x) = N_{00} + N_{01}x \ldots$$

said lens further having a thickness t, a first curvature $CV_1$, and a second curvature $CV_2$, wherein for a lens thickness $t = 1.0$ units, a focal length F.L. = 10.0 units, and infinite conjugates, the relationship between $CV_1$, $CV_2$, and $N_{01}$, the coefficient of the second term of the index of refraction equation, as a function of $N_{00}$, the starting value of the index of refraction, is substantially given by the following table, and interpolations and extrapolations thereof, whereby at least the third-order spherical aberration and coma of said lens are simultaneously reduced

| Thickness = 1.0 | Focal Length = 10.0 | | Infinite Conjugates |
|---|---|---|---|
| $N_{00}$ | $N_{01}$ | $CV_1$ | $CV_2$ |
| +1.50 | −0.069525 | +0.176928 | −0.029158 |
| +1.65 | −0.060580 | +0.155772 | +0.002247 |
| +1.70 | −0.058830 | +0.150876 | +0.009328 |
| +1.80 | −0.056227 | +0.142977 | +0.020656 |

14. A singlet lens having an axial index of refraction gradient according to an equation of the form $$N(x) = N_{00} + N_{01}x \ldots$$

said lens further having a thickness t, a first curvature $CV_1$, and a second curvature $CV_2$, wherein for a focal length, F.L. = 10.0 units, a thickness $t = 1.0$ units, and a starting value of the index of refraction $N_{00} = 1.65$, the relationship between $CV_1$, $CV_2$, and $N_{01}$, the coefficient of the second term of the index of refraction equation, as a function of the object-image conjugates, is substantially given by the following table, and interpolations and extrapolations thereof, whereby at least the third-order spherical aberration and coma of said lens are simultaneously reduced

| N = 1.65 | Focal Length = 10.0 | | Thickness = 1.0 |
|---|---|---|---|
| Conjugates | $N_{01}$ | $CV_1$ | $CV_2$ |
| ∞ | −0.060580 | +0.155772 | +0.002247 |
| 20:1 | −0.068290 | +0.148095 | −0.006926 |
| 10:1 | −0.077089 | +0.141083 | −0.015431 |
| 5:1 | −0.099553 | +0.128723 | −0.031091 |
| 2:1 | −0.216947 | +0.108385 | −0.069923 |
| 1:1 | | | |

15. A singlet lens having a zone therein having an axial index of refraction gradient according to an equation of the form $$N(x) = N_{00} + N_{01}x \ldots$$

said zone being bounded by a plane which is parallel to the y-z plane of the lens, said lens further having a thickness t, a first curvature $CV_1$, and a second curvature $CV_1$, wherein for a starting value of the index of refraction $N_{00} = 1.65$, a lens thickness of $t = 1.0$ units, a focal length of F.L. = 10.0 units, and infinite conjugates, the relationship between $CV_1$, $CV_2$, and $N_{01}$, the coefficient of the second term in the index of refraction equation, as a function of P, the position, in units, of the zone boundary plane from the front surface of the lens, is substantially given by the following table, and interpolations and extrapolations thereof whereby at least the third-order spherical aberration and coma of said lens are simultaneously reduced

| N = 1.65 | F.L. = 10.0 | Thickness = 1.0 | | Infinite Conjugates |
|---|---|---|---|---|
| P | $N_{01}$ | | $CV_1$ | $CV_2$ |
| +0.5 | +0.060708 | | −0.160172 | −0.005703 |
| +0.2 | +0.060715 | | −0.160132 | −0.005821 |
| +0.1 | +0.060719 | | −0.160115 | −0.005858 |
| +0.05 | +0.060721 | | −0.160106 | −0.005875 |
| +0.01 | +0.060723 | | −0.160098 | −0.005890 |

16. An optical system comprising, in combination, a singlet lens and a stop, said lens having a radial index of refraction gradient according to an equation of the form $$N(\rho) = N_{00} + N_{10}\rho + N_{20}\rho^2 \ldots$$

where, $\rho = y^2 + z^2$ said lens further having a thickness t, a first curvature $CV_1$, and a second curvature $CV_2$, wherein for a thickness $t = 1.75$ units, a focal length, F.L. = 10 units, and infinite conjugates, the relationship between $CV_1$, $CV_2$, the stop to lens distance $D_s$, and $N_{10}$ and $N_{20}$, the coefficients of the second and third terms of the index of refraction equation, respectively, as a function of the starting value for the index of refraction $N_{00}$, is substantially given by the following table, and whereby at least the third-order spherical aberration, coma, astigmatism and distortion of said system are simultaneously reduced

| Thickness = 1.75 | | Focal Length = 10.0 | | Infinite Conjugates | |
|---|---|---|---|---|---|
| $N_{00}$ | $N_{10}$ | $N_{20}$ | $CV_1$ | $CV_2$ | $D_s$ |
| 1.4 | +0.06689 | +0.023177 | +0.255839 | −0.561284 | +1.050289 |
| 1.522 | +0.098271 | +0.32214 | +0.299565 | −0.527441 | |
| 1.6 | +0.126280 | +0.042136 | +0.374174 | −0.50294 | +0.203626 |

17. An optical system comprising, in combination, a singlet lens and a stop, said lens having a radial index of refraction gradient according to an equation of the form $$N(\rho) = N_{00} + N_{10}\rho + N_{20}\rho^2 \ldots,$$

where, $\rho = y^2 + z^2$ said lens further having a thickness t, a first curvature $CV_1$, and a second curvature $CV_2$, wherein for a thickness $t = 1.75$ units, a starting value for the index of refraction $N_{00} = 1.60$ and infinite conjugates, the relationship between $CV_1$, $CV_2$, the stop to lens distance $D_s$, and $N_{10}$ and $N_{20}$, the coefficients of the second and third terms of the index of refraction index, respectively, as a function of the focal length F.L., is substantially given by the following table, and whereby at least the third-order spherical aberration, coma, astigmatism and distortion of said system are simultaneously reduced

| Thickness = 1.75 | | $N_{00}$ = 1.60 | | Infinite Conjugates | |
|---|---|---|---|---|---|
| F.L. | $N_{10}$ | $N_{20}$ | $CV_1$ | $CV_2$ | $D_s$ |
| 20 | +0.108187 | +0.026284 | +0.307478 | −0.386190 | +0.167624 |
| 15 | +0.114673 | +0.031391 | +0.321045 | −0.435438 | +0.182362 |
| 10 | +0.126280 | +0.042136 | +0.374174 | −0.502954 | +0.203626 |
| 5 | +0.131524 | +0.062811 | +0.442996 | −0.641479 | +1.9924 |

18. An optical system comprising, in combination, a singlet lens and a stop, said lens having a radial index of refraction gradient according to an equation of the form $$N(\rho) = N_{00} + N_{10}\rho + N_{20}\rho^2 \ldots,$$

where, $\rho = y^2 + z^2$
said lens further having a thickness $t$, a first curvature $CV_1$, and a second curvature $CV_2$, wherein for a thickness $t$ = 1.75 units, a focal length F.L. = 10.0 units, a starting value for the index of refraction $N_{00}$ = 1.60, the relationship between $CV_1$, $CV_2$, the stop to lens distance $D_s$, and $N_{10}$ and $N_{20}$, the coefficients of the second and third terms of the index of refraction equation, respectively, as a function of the object-image conjugates, is substantially given by the following table, and whereby at least the third-order spherical aberration, coma, astigmatism and distortion of said system are simultaneously reduced

| Thickness = 1.75 | | Focal Length = 10 | | $N_{00}$ = 1.60 | |
|---|---|---|---|---|---|
| Conjugates | $N_{10}$ | $N_{20}$ | $CV_1$ | $CV_2$ | $D_s$ |
| ∞ | 0.126280 | 0.042136 | 0.374174 | −0.502954 | 0.203626 |
| 20:1 | 0.120395 | 0.039118 | 0.327927 | −0.513103 | 0.522978 |
| 10:1 | 0.117710 | 0.037884 | 0.304176 | −0.519038 | 0.702876 |
| 5:1 | 0.114577 | 0.036563 | 0.273485 | −0.527172 | 0.955217 |
| 2:1 | 0.110197 | 0.035040 | 0.221524 | −0.542673 | 1.461615 |
| 1:1 | 0.107477 | 0.034451 | 0.178295 | −0.557495 | |

19. An optical system comprising, in combination, a singlet lens and a stop, said lens having a radial index of refraction gradient according to an equation of the form $$N(\rho) = N_{00} + N_{10}\rho + N_{20}\rho^2 \ldots,$$

where, $\rho = y^2 + z^2$
said lens further having a thickness $t$, a first curvature $CV_1$, and a second curvature $CV_2$, wherein for a focal length, F.L. = 10.0 units, a starting value for the index of refraction $N_{00}$ = 1.60 and infinite conjugates, the relationship between $CV_1$, $CV_2$, the stop to lens distance $D_s$, and $N_{10}$ and $N_{20}$, the coefficients of the second and third terms of the index of refraction equation, respectively, as a function of the lens thickness $t$, is substantially given by the following table, and whereby at least the third-order spherical aberration, coma, astigmatism and distortion of said system are simultaneously reduced

| Focal Length = 10 | | Infinite Conjugates | | $N_{00}$ = 1.60 | |
|---|---|---|---|---|---|
| Thickness | $N_{10}$ | $N_{20}$ | $CV_1$ | $CV_2$ | $D_s$ |
| 3.0 | 0.045232 | 0.006746 | 0.252046 | −0.354604 | 3.423346 |
| 2.5 | 0.061631 | 0.011826 | 0.252132 | −0.409335 | 3.890436 |
| 2.0 | 0.090124 | 0.023948 | 0.251569 | −0.488262 | 2.380245 |
| 1.75 | 0.126280 | 0.042136 | 0.374174 | −0.502954 | 0.203626 |

20. A singlet lens, said lens having a radial index of refraction gradient according to an equation of the form $$N(\rho) = N_{00} + N_{10}\rho + N_{20}\rho^2 \ldots,$$

where, $\rho = y^2 + z^2$
said lens further having a thickness $t$, a first curvature $CV_1$, and a second curvature $CV_2$, wherein for a thickness $t$ = 1.75 units, a focal length F.L. = 10 units and infinite conjugates, the relationship between $CV_1$, $CV_2$, and $N_{10}$ and $N_{20}$, the coefficients of the second and third terms of the index of refraction equation, respectively, as a function of the starting value for the index of refraction $N_{00}$, is substantially given by the following table, and whereby at least the third-order spherical aberration, coma, and astigmatism of said lens are simultaneously reduced

| Thickness = 1.75 | Focal Length = 10.0 | | Infinite Conjugates | |
|---|---|---|---|---|
| $N_{00}$ | $N_{10}$ | $N_{20}$ | $CV_1$ | $CV_2$ |
| 1.4 | +0.06689 | +0.023177 | +0.255839 | −0.561284 |
| 1.522 | +0.098271 | +0.32214 | +0.299565 | −0.527441 |
| 1.6 | +0.126280 | +0.042136 | +0.374174 | −0.50294 |

21. A singlet lens, said lens having a radial index of refraction gradient according to an equation of the form $$N(\rho) = N_{00} + N_{10}\rho + N_{20}\rho^2 \ldots,$$

where $\rho = y^2 + z^2$
said lens further having a thickness $t$, a first curvature $CV_1$, and a second curvature $CV_2$, wherein for a thickness $t$ = 1.75 units, a focal length, F.L. = 10 units and infinite conjugates, the relationship between $CV_1$, $CV_2$, and $N_{10}$ and $N_{20}$, the coefficients of the second and third terms of the index of refraction equation, respectively, as a function of the starting value for the index of refraction $N_{00}$, is substantially given by the following table, and whereby at least the third-order spherical aberration, coma, and astigmatism of said lens are simultaneously reduced

| Thickness = 1.75 | Focal Length = 10.0 | | Infinite Conjugates | |
|---|---|---|---|---|
| $N_{00}$ | $N_{10}$ | $N_{20}$ | $CV_1$ | $CV_2$ |
| 1.4 | −0.084520 | +0.002668 | +0.209143 | +0.853189 |
| 1.5 | −0.088781 | +0.001322 | +0.237134 | +0.835703 |
| 1.6 | −0.092238 | +0.000117 | +0.260641 | +0.833375 |

22. A singlet lens, said lens having a radial index of refraction gradient according to an equation of the form $$N(\rho) = N_{00} + N_{10}\rho + N_{20}\rho^2 \ldots,$$

where, $\rho = y^2 + z^2$
said lens further having a thickness $t$, a first curvature $CV_1$, and a second curvature $CV_2$, wherein for a thickness $t$ = 1.75 units, a starting value for the index of refraction $N_{00}$ = 1.60 and infinite conjugates, the relationship between $CV_1$, $CV_2$, and $N_{10}$ and $N_{20}$, the coefficients of the second and third terms of the index of refraction index, respectively, as a function of the focal length, F.L., is substantially given by the following table, and whereby at least the third-order spherical aberration, coma, and astigmatism of said lens are simultaneously reduced

| Thickness = 1.75 | $N_{00}$ = 1.60 | | Infinite Conjugates | |
|---|---|---|---|---|
| F.L. | $N_{10}$ | $N_{20}$ | $CV_1$ | $CV_2$ |
| 20 | +0.108187 | +0.026284 | +0.307478 | −0.386190 |
| 15 | +0.114673 | +0.031391 | +0.321045 | −0.435438 |
| 10 | +0.126280 | +0.042136 | +0.374174 | −0.502954 |
| 5 | +0.131524 | +0.062811 | +0.442996 | −0.641479 |

23. A singlet lens, said lens having a radial index of refraction gradient according to an equation of the form $$N(\rho) = N_{00} + N_{10}\rho + N_{20}\rho^2 \ldots,$$

where, $\rho = y^2 + z^2$ said lens further having a thickness $t$, a first curvature $CV_1$, and a second curvature $CV_2$, wherein for a thickness $t = 1.75$ units, a starting value for the index of refraction $N_{00} = 1.60$ and infinite conjugates, the relationship between $CV_1$, $CV_2$, and $N_{10}$ and $N_{20}$, the coefficients of the second and third terms of the index of refraction index, respectively, as a function of the focal length, F.L., is substantially given by the following table, and whereby at least the third-order spherical aberration, coma, and astigmatism of said lens are simultaneously reduced

| Thickness = 1.75 F.L. | $N_{00} = 1.60$ $N_{10}$ | $N_{20}$ | Infinite Conjugates $CV_1$ | $CV_2$ |
|---|---|---|---|---|
| +20 | −0.053598 | +0.000826 | +0.184690 | +0.492021 |
| +15 | −0.067289 | +0.000839 | +0.211435 | +0.606620 |
| +10 | −0.092238 | +0.000117 | +0.260641 | +0.833375 |
| +05 | −0.158702 | −0.008915 | +0.396015 | +1.642075 |

24. A singlet lens, said lens having a radial index of refraction gradient according to an equation of the form $$N(\rho) = N_{00} + N_{10}\rho + N_{20}\rho^2 \ldots,$$

where, $\rho = y^2 + z^2$ said lens further having a thickness $t$, a first curvature $CV_1$, and a second curvature $CV_2$, wherein for a thickness $t = 1.75$ units, a focal length F.L. = 10.0 units, a starting value for the index of refraction $N_{00} = 1.60$, the relationship between $CV_1$, $CV_2$, and $N_{10}$ and $N_{20}$, the coefficients of the second and third terms of the index of refraction equation, respectively, as a function of the object-image conjugates, is substantially given by the following table, and whereby at least the third-order spherical aberration, coma, and astigmatism of said lens are simultaneously reduced

| Thickness = 1.75 Conjugates | Focal Length = 10 $N_{10}$ | $N_{20}$ | $N_{00} = 1.60$ $CV_1$ | $CV_2$ |
|---|---|---|---|---|
| ∞ | 0.126280 | +0.042136 | +0.374174 | −0.502954 |
| 20:1 | 0.120395 | +0.039118 | +0.327927 | −0.513103 |
| 10:1 | 0.117710 | +0.037884 | +0.304176 | −0.519038 |
| 5:1 | 0.114577 | +0.036563 | +0.273485 | −0.527172 |
| 2:1 | 0.110197 | +0.035040 | +0.221524 | −0.542673 |
| 1:1 | 0.107477 | +0.034451 | +0.178295 | −0.557495 |

25. A singlet lens, said lens having a radial index of refraction gradient according to an equation of the form $$N(\rho) = N_{00} + N_{10}\rho + N_{20}\rho^2 \ldots,$$

where, $\rho = y^2 + z^2$ said lens further having a thickness $t$, a first curvature $CV_1$, and a second curvature $CV_2$, wherein for a thickness $t = 1.75$ units, a focal length, F.L. = 10.0 units, a starting value for the index of refraction $N_{00} = 1.60$, the relationship between $CV_1$, $CV_2$, and $N_{10}$ and $N_{20}$, the coefficients of the second and third terms of the index of refraction equation, respectively, as a function of object-image conjugates, is substantially given by the following table, and whereby at least the third-order spherical aberration, coma, and astigmatism of said lens are simultaneously reduced

| Thickness = 1.75 Conjugates | Focal Length = 10 $N_{10}$ | $N_{20}$ | $N_{00} = 1.60$ $CV_1$ | $CV_2$ |
|---|---|---|---|---|
| ∞ | −0.992238 | 0.000117 | +0.260641 | +0.833375 |
| 20:1 | −0.092900 | 0.000548 | +0.250957 | +0.816016 |
| 10:1 | −0.093489 | 0.000935 | +0.242169 | +0.800673 |
| 5:1 | −0.094462 | 0.001604 | +0.226825 | +0.774626 |
| 2:1 | −0.096571 | 0.003021 | +0.193687 | +0.722555 |
| 1:1 | −0.098693 | 0.004366 | +0.161507 | +0.677219 |

26. A singlet lens, said lens having a radial index of refraction gradient according to an equation of the form $$N(\rho) = N_{00} + N_{10}\rho + N_{20}\rho^2 \ldots,$$

where, $\rho = y^2 + z^2$ said lens further having a thickness $t$, a first curvature $CV_1$, a second curvature $CV_2$, wherein for a focal length, F.L. = 10.0 units, a starting value for the index of refraction $N_{00} = 1.60$ and infinite conjugates, the relationship between $CV_1$, $CV_2$, and $N_{10}$ and $N_{20}$, the coefficients of the second and third terms of the index of refraction equation, respectively, as a function of the lens thickness $t$, is substantially given by the following table, and whereby at least the third-order spherical aberration, coma, and astigmatism of said lens are simultaneously reduced

| Focal Length = 10 Thickness | Infinite Conjugates $N_{10}$ | $N_{20}$ | $N_{00} = 1.60$ $CV_1$ | $CV_2$ |
|---|---|---|---|---|
| 3.0 | +0.045232 | +0.006746 | +0.252046 | −0.354604 |
| 2.5 | +0.061631 | +0.011826 | +0.252132 | −0.409335 |
| 2.0 | +0.090124 | +0.023948 | +0.251569 | −0.488262 |
| 1.75 | +0.126280 | +0.042136 | +0.374174 | −0.502954 |

27. A singlet lens having a radial index of refraction gradient according to an equation of the form $$N(\rho) = N_{00} + N_{10}\rho + N_{20}\rho^2 \ldots,$$

where $\rho = y^2 + z^2$ said lens further having a thickness $t$, a first curvature $CV_1$, and a second curvature $CV_2$, wherein for a focal length F.L. = 10.0 units, a starting value for the index of refraction $N_{00} = 1.60$ and infinite conjugates, the relationship between $CV_1$, $CV_2$, and $N_{10}$ and $N_{20}$, the coefficients of the second and third terms of the index of refraction equation, respectively, as a function of the lens thickness $t$, is substantially given by the following table, and whereby at least the third-order spherical aberration, coma, and astigmatism of said lens are simultaneously reduced

| Focal Length = 10 Thickness | Infinite Conjugates $N_{10}$ | $N_{20}$ | $N_{00} = 1.60$ $CV_1$ | $CV_2$ |
|---|---|---|---|---|
| 3.0 | −0.047735 | −0.000605 | +0.209069 | +0.803016 |
| 2.5 | −0.059577 | −0.000586 | +0.224043 | +0.800711 |
| 2.0 | −0.078299 | −0.000308 | +0.245681 | +0.816579 |
| 1.75 | −0.092238 | +0.000117 | +0.260641 | +0.833875 |
| 1.50 | −0.111418 | +0.001031 | +0.280029 | +0.858299 |
| 1.00 | −0.182527 | +0.008065 | +0.343729 | +0.947781 |

28. A singlet lens having plane parallel surfaces comprised of glass having a radial index of refraction gradient given by an equation of the form $$N(\rho) = N_{00} + N_{10}\rho = N_{20}\rho^2 + \ldots,$$

where, $\rho = y^2 + z^2$, said lens having a thickness $t$ units, an object to lens distance $D_o$ units, an image to lens distance $D_i$ units, a starting value for the index of refraction $N_{00} = 1.5$, wherein for a lens having at least the third-order spherical aberration reduced, the relationship between $N_{10}$ and $N_{20}$, the second and third coefficients, respectively, of the index of refraction equation, and $t$, $D_o$, and $D_i$, are as substantially set forth in the following table, and interpolations and extrapolations thereof

| $D_0$ | t | $D_1$ | $N_{10}$ | $N_{20}$ |
|---|---|---|---|---|
| infinite | 1.000 | −100.00 | 0.005011 | −0.000000 |
| infinite | 1.000 | −050.00 | 0.010045 | −0.000001 |
| infinite | 1.000 | −010.00 | 0.051131 | −0.000176 |
| infinite | 1.000 | −002.50 | 0.219107 | −0.014349 |
| infinite | 1.000 | 2.50 | −0.183424 | 0.007509 |
| infinite | 1.000 | 10.00 | −0.048908 | 0.000149 |
| infinite | 1.000 | 50.00 | −0.009956 | 0.000001 |
| infinite | 1.000 | 100.00 | −0.004989 | 0.000000 |
| −40.00 | 1.000 | 10.00 | −0.036064 | 0.000145 |
| −20.00 | 1.000 | 10.00 | −0.023076 | 0.000125 |
| −08.00 | 1.000 | 10.00 | 0.016760 | −0.000218 |
| −04.00 | 1.000 | 10.00 | 0.086184 | −0.003062 |
| −02.00 | 1.000 | 10.00 | 0.237331 | −0.031119 |
| 2.00 | 1.000 | 10.00 | −0.278570 | 0.014309 |
| 4.00 | 1.000 | 10.00 | −0.169914 | 0.002319 |
| 8.00 | 1.000 | 10.00 | −0.111058 | 0.000455 |
| infinite | 0.100 | 10.00 | −0.498891 | 0.001607 |
| infinite | 0.250 | 10.00 | −0.198894 | 0.000635 |
| infinite | 0.500 | 10.00 | −0.098899 | 0.000311 |
| infinite | 1.000 | 10.00 | −0.048908 | 0.000149 |
| infinite | 2.000 | 10.00 | −0.023927 | 0.000069 |

\* \* \* \* \*